(12) United States Patent
Gale

(10) Patent No.: US 11,102,153 B2
(45) Date of Patent: *Aug. 24, 2021

(54) MULTISTATE PRESENCE AND RESPONSIVENESS TRACKING AND INDICATION

(71) Applicant: MICROSOFT TECHNOLOGY LICENSING, LLC, Redmond, WA (US)

(72) Inventor: Edwin James Gale, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,591

(22) Filed: May 5, 2019

(65) Prior Publication Data

US 2020/0351224 A1 Nov. 5, 2020

(51) Int. Cl.
| | |
|---|---|
| *H04L 12/58* | (2006.01) |
| *G08B 5/36* | (2006.01) |
| *G08B 21/22* | (2006.01) |
| *H04L 29/08* | (2006.01) |
| *G06F 3/0484* | (2013.01) |

(52) U.S. Cl.
CPC .............. *H04L 51/043* (2013.01); *G08B 5/36* (2013.01); *G08B 21/22* (2013.01); *H04L 67/24* (2013.01); *G06F 3/04842* (2013.01)

(58) Field of Classification Search
CPC ......... H04L 51/043; H04L 67/24; G08B 5/36; G08B 21/22; G06F 3/04842
See application file for complete search history.

(56) References Cited

U.S. PATENT DOCUMENTS

| | | | |
|---|---|---|---|
| 7,035,865 B2 | 4/2006 | Doss et al. | |
| 7,698,648 B2 | 4/2010 | Rollin et al. | |
| 8,930,472 B2 | 1/2015 | Leacock et al. | |
| 2003/0046296 A1* | 3/2003 | Doss | H04L 51/04 |
| 2007/0233850 A1 | 10/2007 | Szeto | |

(Continued)

FOREIGN PATENT DOCUMENTS

| | | |
|---|---|---|
| WO | 2008003561 A1 | 1/2008 |
| WO | 2015084432 A1 | 6/2015 |

OTHER PUBLICATIONS

Kartofel, Roy Alexis Rodenstein, "Talking in Circles", In Master's Thesis of Massachusetts Institute of Technology, May 15, 2000, 66 Pages.

(Continued)

*Primary Examiner* — Mohamed Barakat
(74) *Attorney, Agent, or Firm* — NovoTechIP International PLLC

(57) ABSTRACT

Systems and methods are described, and one method includes receiving, from a network, data indicative of an object person's current presence status and current responsiveness status, and based at least in part on the data, displaying an indicator image that includes a first region and a second region according to a mutual spatial structure, and concurrently displaying the first region with a first state appearance and the second region with a second state appearance, the first state appearance indicative of the current presence status, and the second state appearance indicative of the current responsiveness status.

20 Claims, 22 Drawing Sheets

(56) References Cited

U.S. PATENT DOCUMENTS

| | | | |
|---|---|---|---|
| 2010/0162139 A1* | 6/2010 | Beebe | G06F 3/0484 |
| | | | 715/760 |
| 2010/0253504 A1 | 10/2010 | Lliteras et al. | |
| 2011/0035443 A1* | 2/2011 | Jensen | H04L 51/043 |
| | | | 709/204 |
| 2012/0240058 A1* | 9/2012 | Chakra | H04L 51/04 |
| | | | 715/753 |
| 2015/0294633 A1 | 10/2015 | Jung et al. | |
| 2016/0100019 A1 | 4/2016 | Leondires | |
| 2016/0241496 A1* | 8/2016 | Cunico | H04L 67/24 |
| 2019/0272682 A1 | 9/2019 | Qian et al. | |
| 2020/0351365 A1 | 11/2020 | Gale | |

OTHER PUBLICATIONS

"Microsoft Lync Server 2013 Documentation (Selected Chapters)", In the Book of Microsoft Lync Server 2013, Jul. 10, 2013, 6 Pages.

"International Search Report and Written Opinion Issued in PCT Application No. PCT/US2020/027117", dated Jul. 3, 2020, 11 Pages.

"Preinterview First Office Action Issued in U.S. Appl. No. 16/403,585", dated Jan. 26, 2021, 4 Pages.

"International Search Report and Written Opinion Issued in PCT Application No. PCT/US20/027118", dated Jul. 2, 2020, 12 Pages.

"Notice of Allowance Issued in U.S. Appl. No. 16/234,211", dated May 5, 2021, 22 Pages.

* cited by examiner

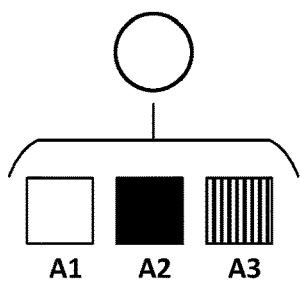
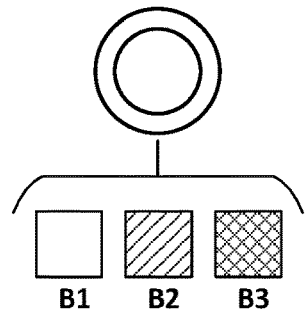
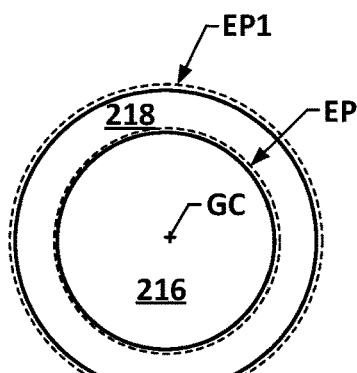
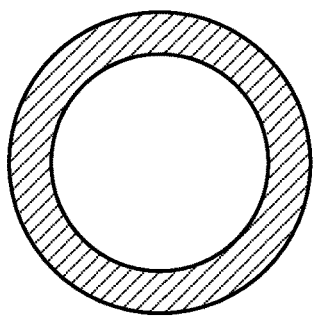
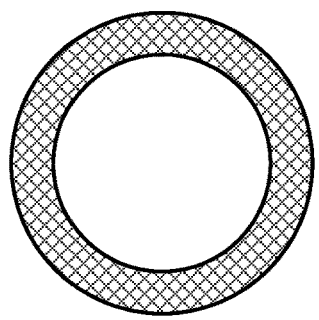
FIG. 3A  FIG. 3B  FIG. 3C
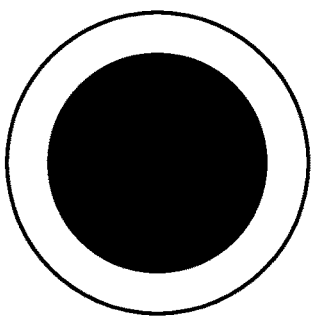
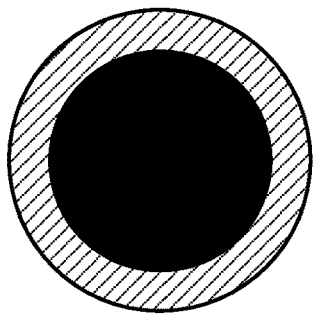
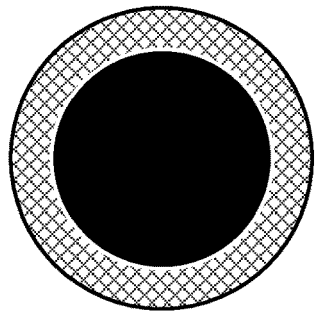
FIG. 3D  FIG. 3E  FIG. 3F
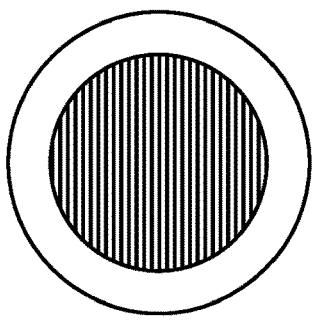
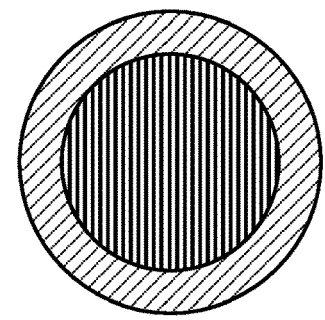
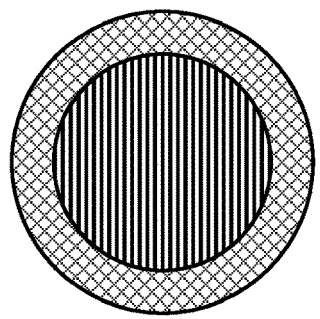
FIG. 3G  FIG. 3H  FIG. 3I

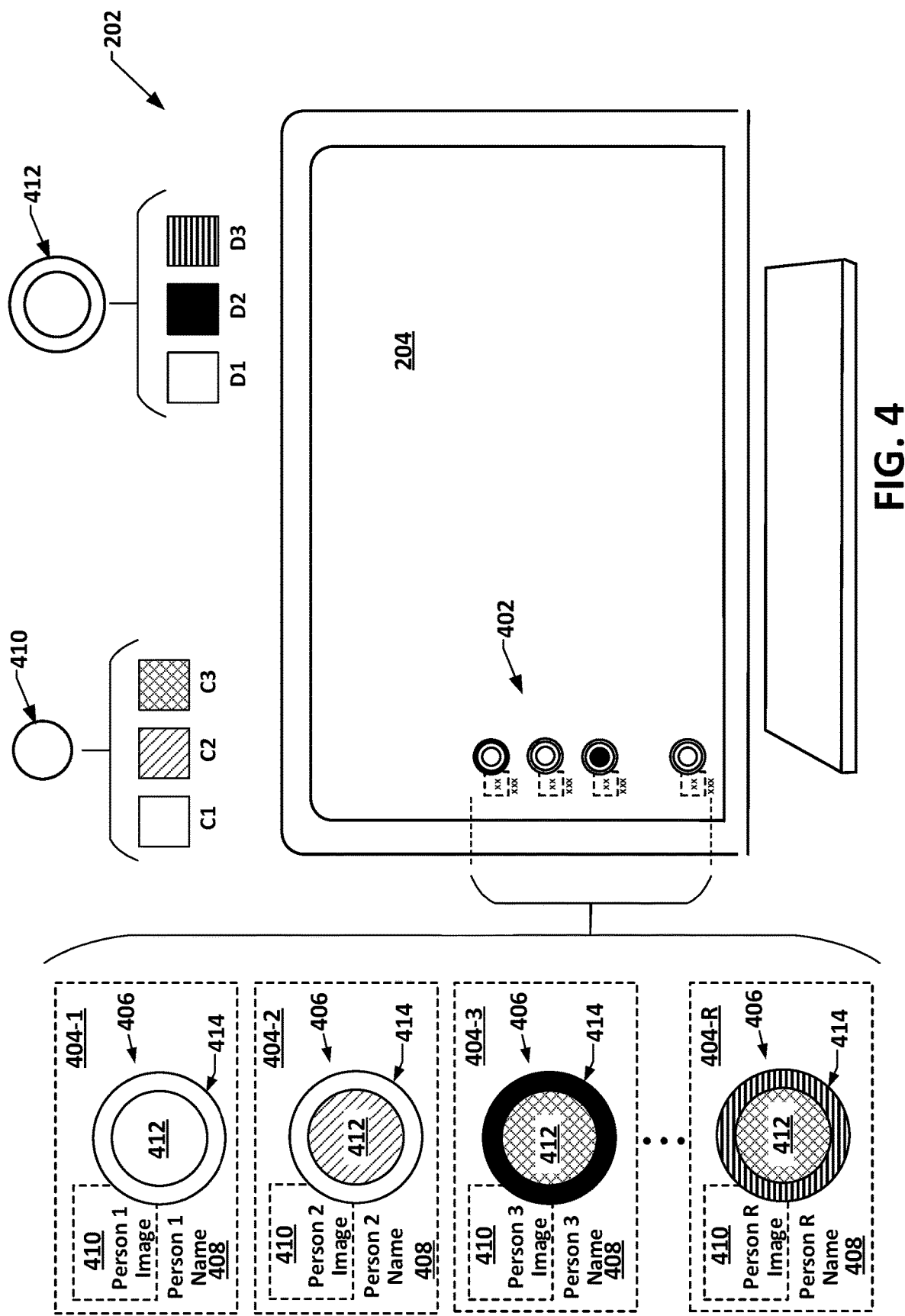

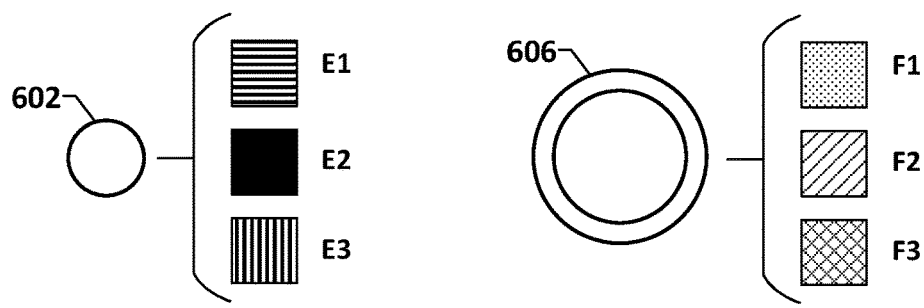
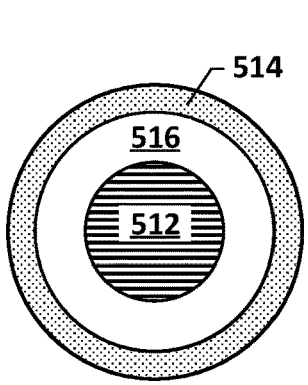
FIG. 6A
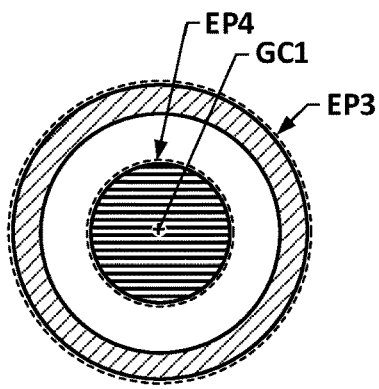
FIG. 6B
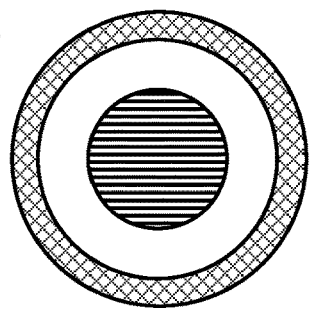
FIG. 6C
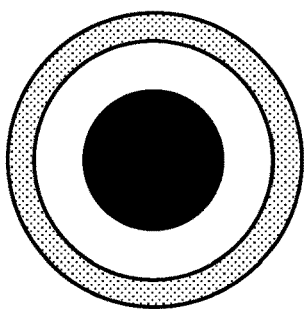
FIG. 6D
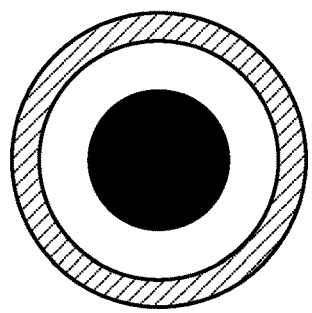
FIG. 6E
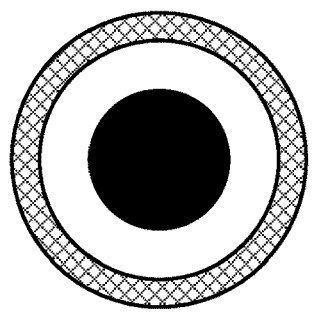
FIG. 6F
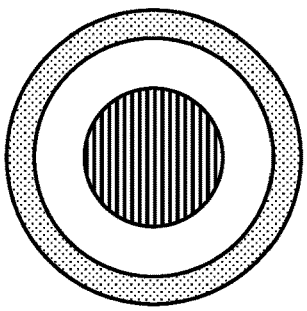
FIG. 6G
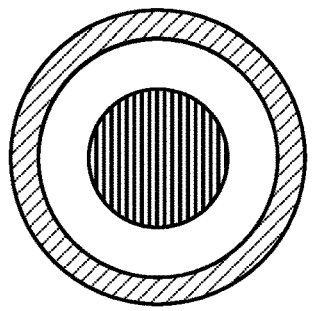
FIG. 6H
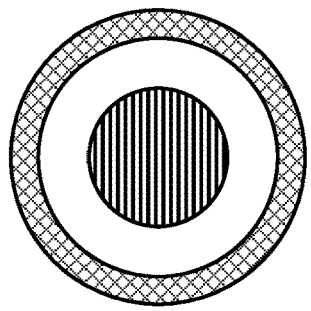
FIG. 6I

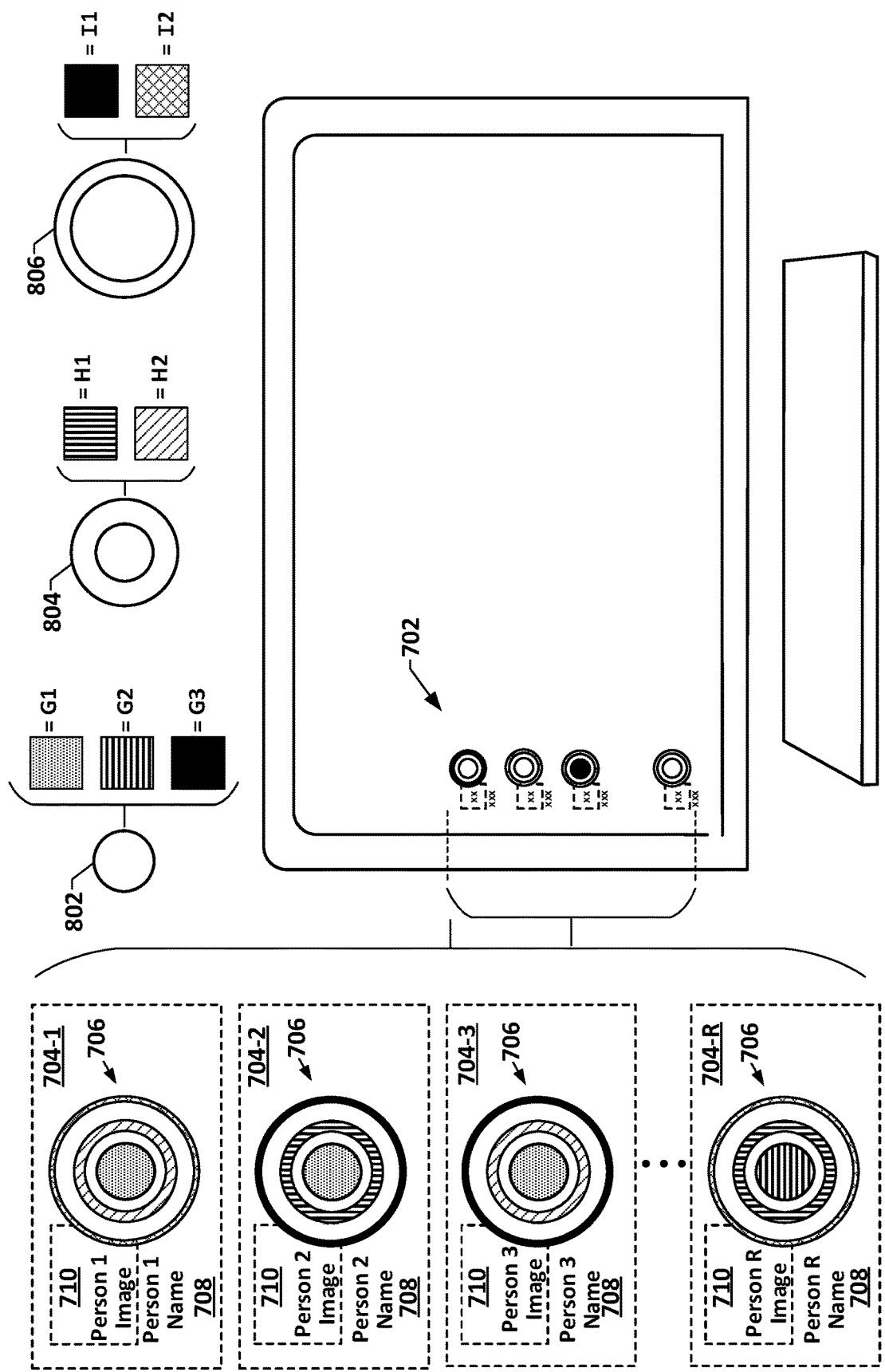

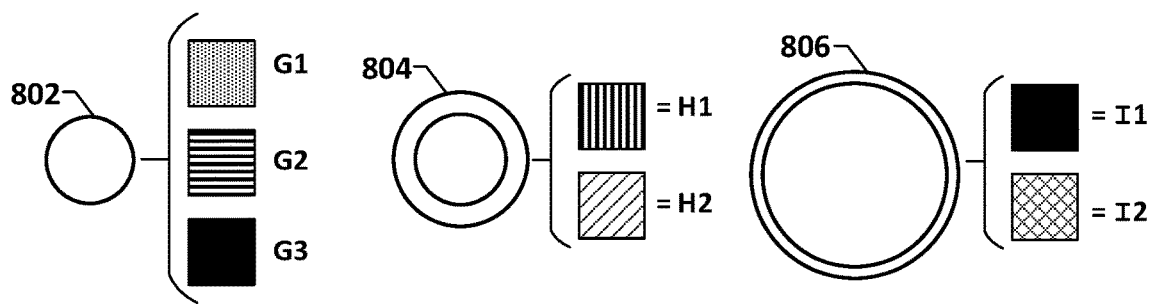
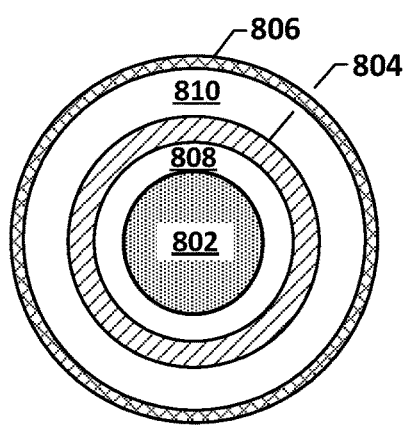
FIG. 8A
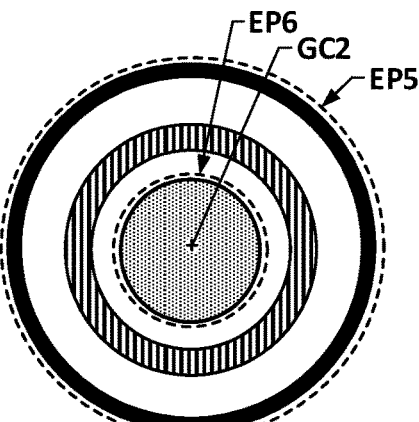
FIG. 8B
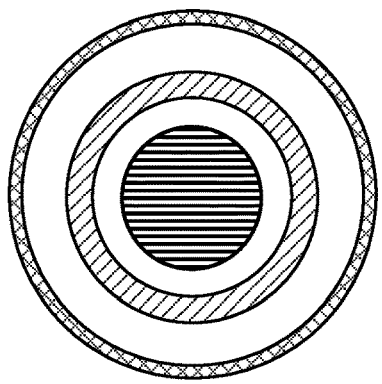
FIG. 8C
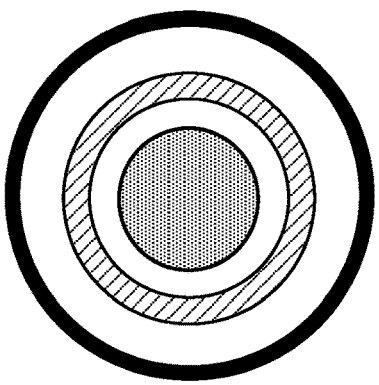
FIG. 8D
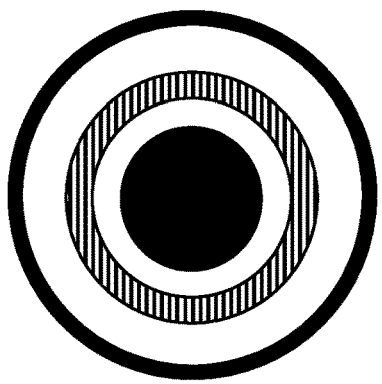
FIG. 8E
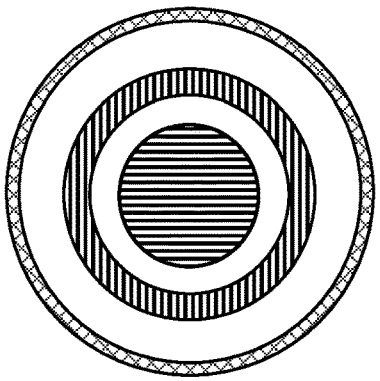
FIG. 8F

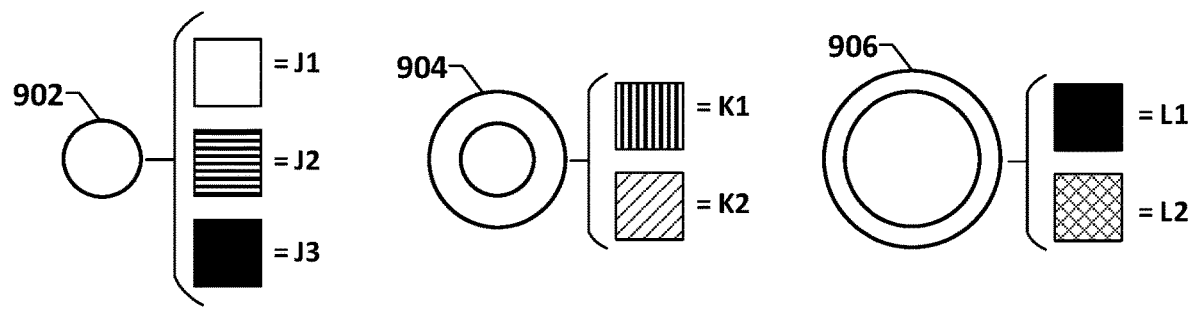
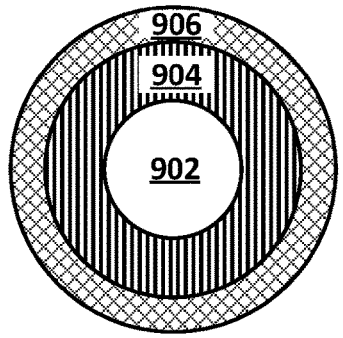
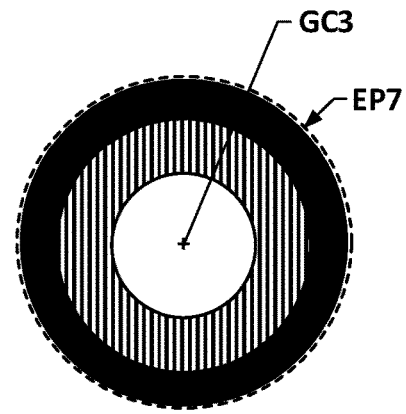
FIG. 9A
FIG. 9B
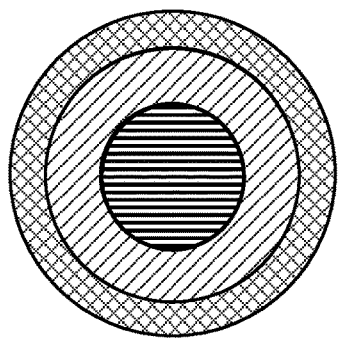
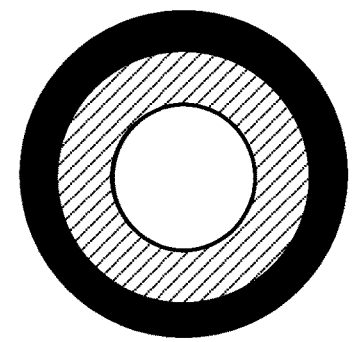
FIG. 9C
FIG. 9D
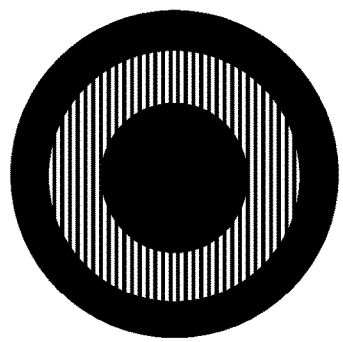
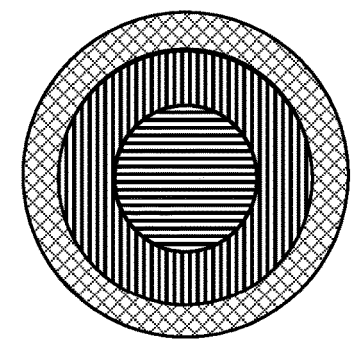
FIG. 9E
FIG. 9F

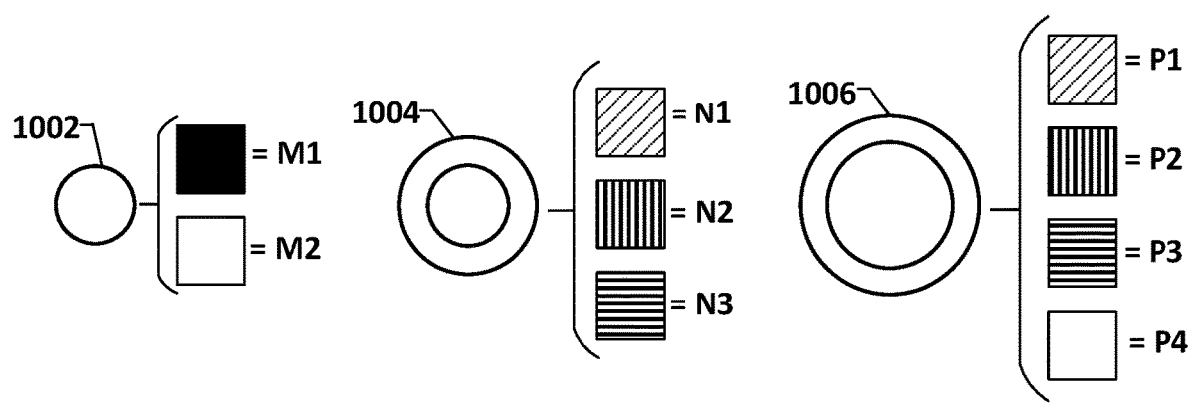
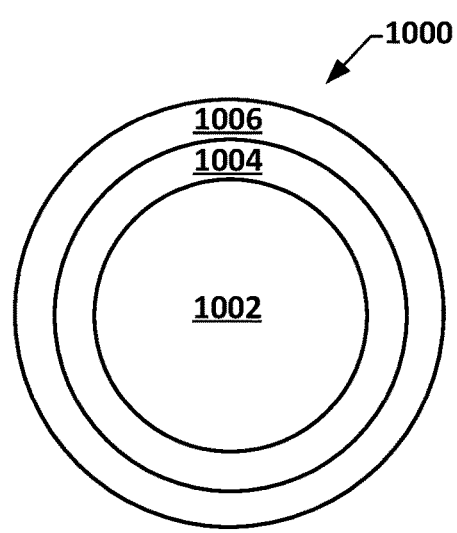
FIG. 10A
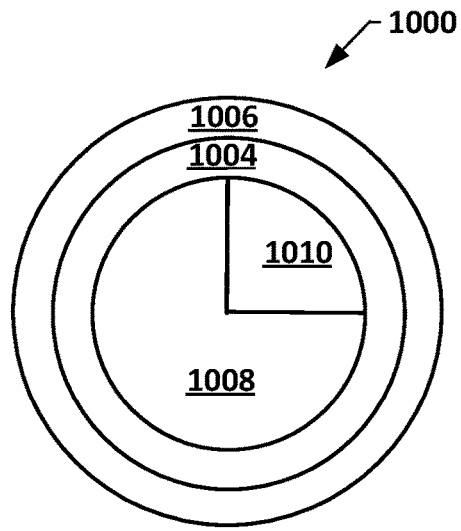
FIG. 10B
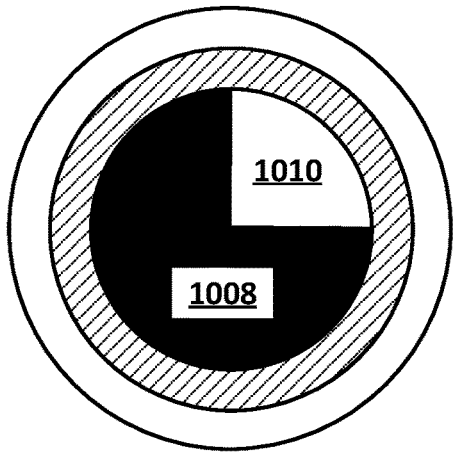
FIG. 11A
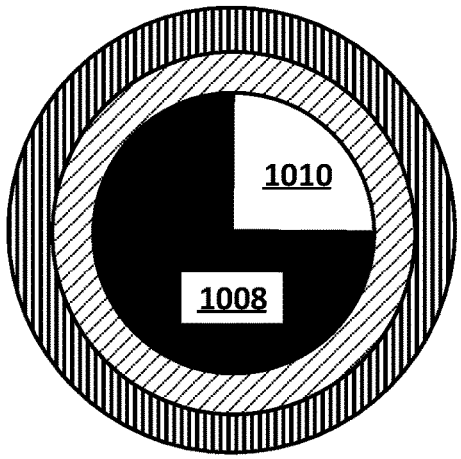
FIG. 11B

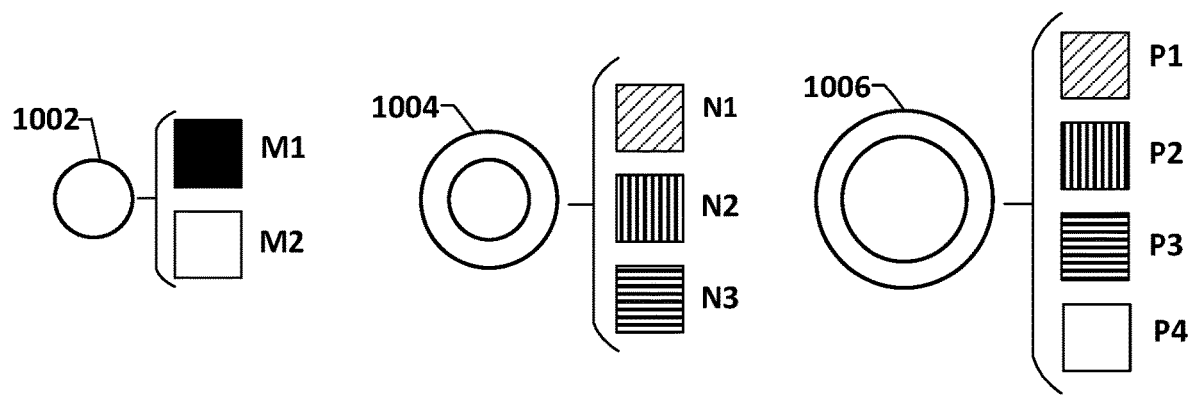
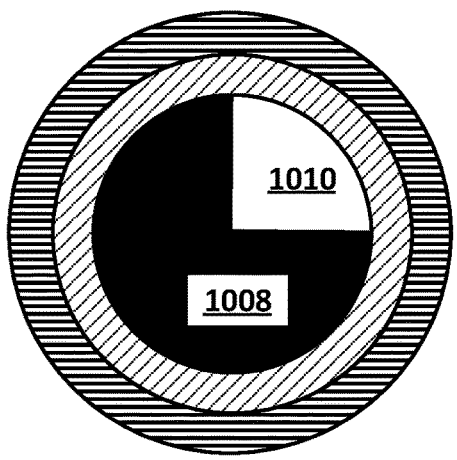
FIG. 11C
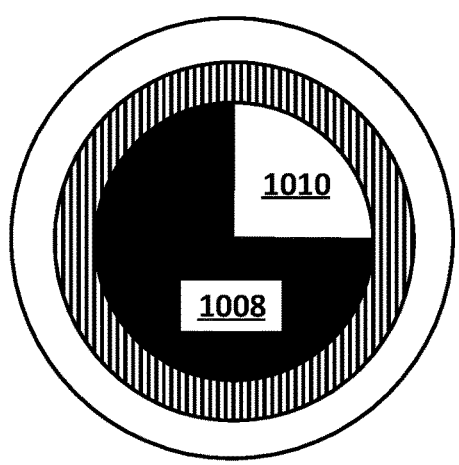
FIG. 11D
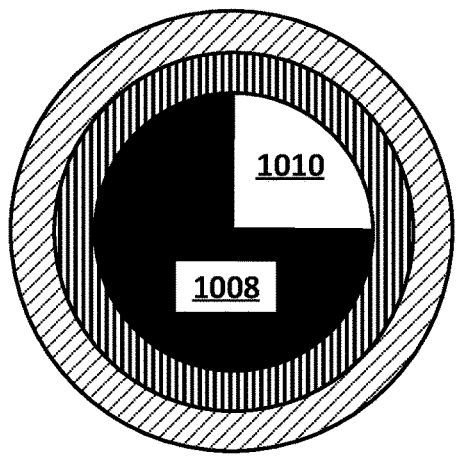
FIG. 11E
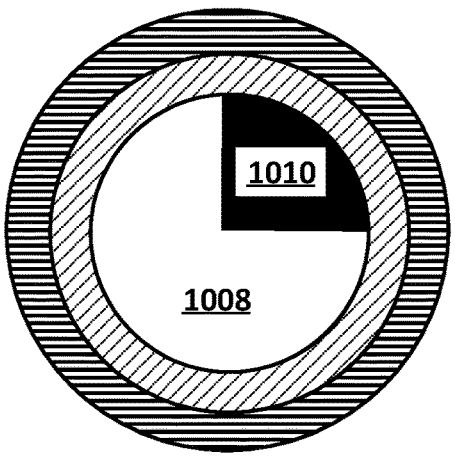
FIG. 11F

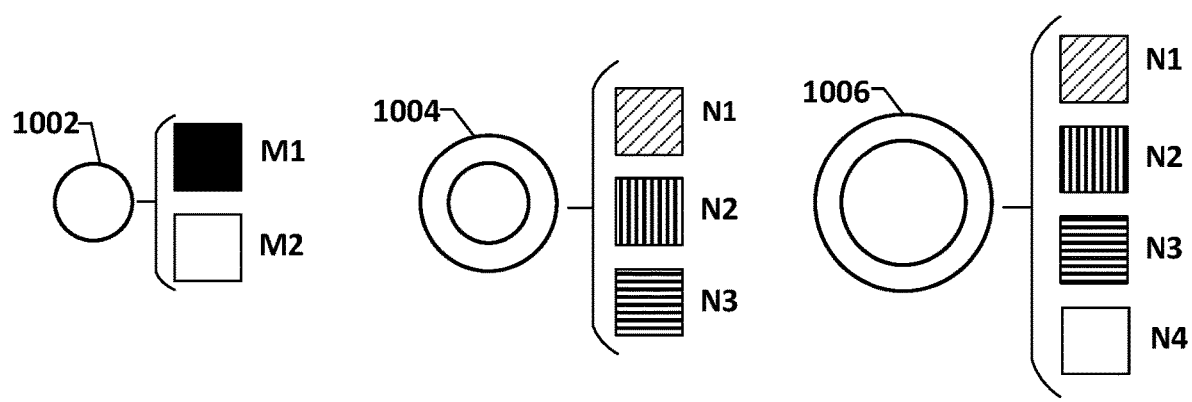
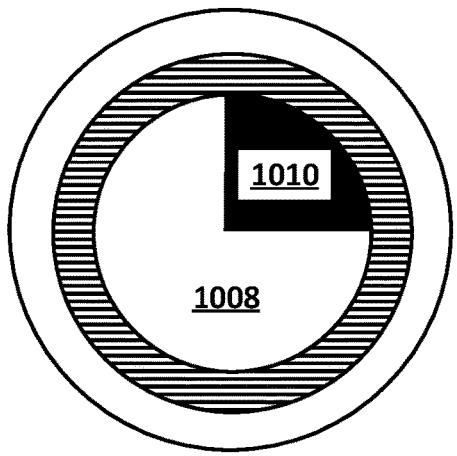
FIG. 11G
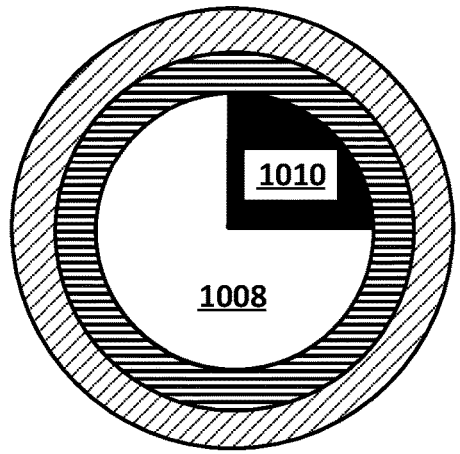
FIG. 11H
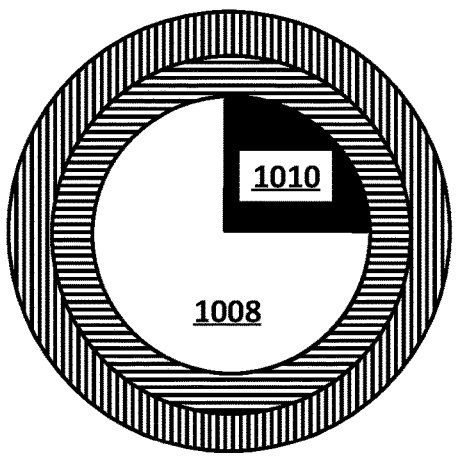
FIG. 11I

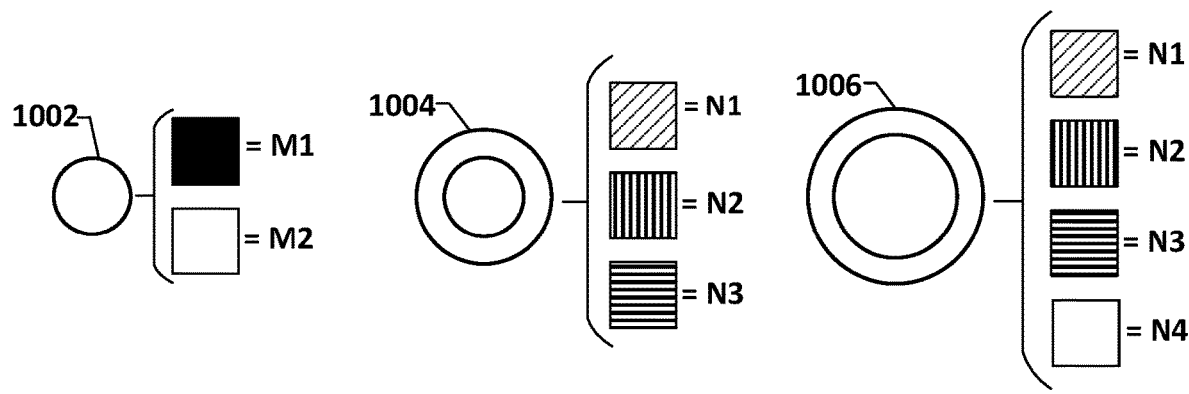
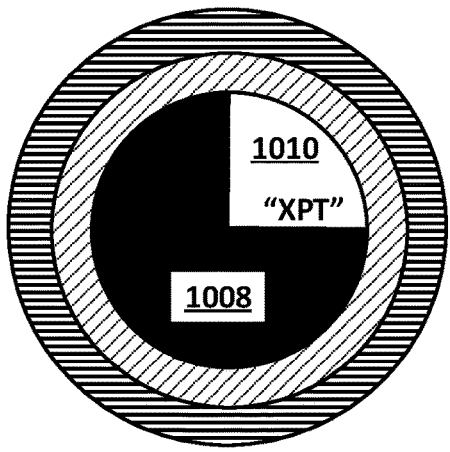
FIG. 12A
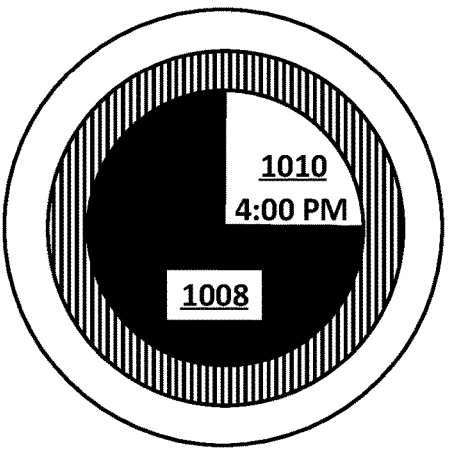
FIG. 12B
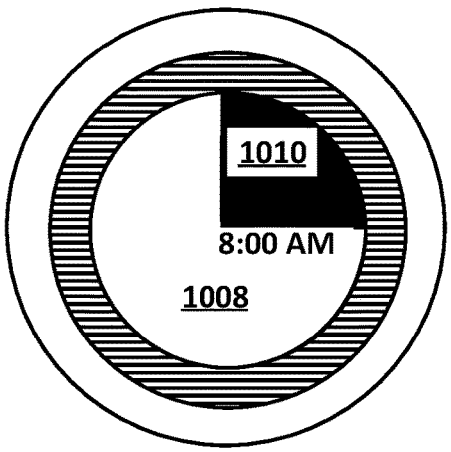
FIG. 12C
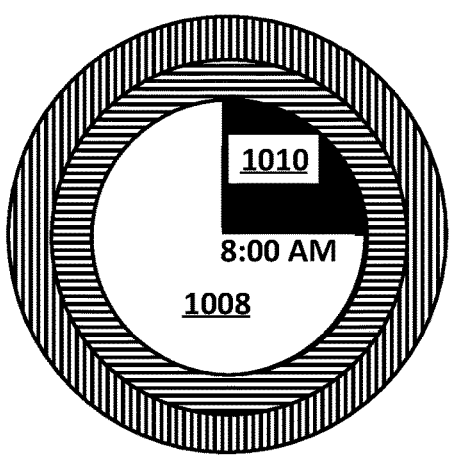
FIG. 12D

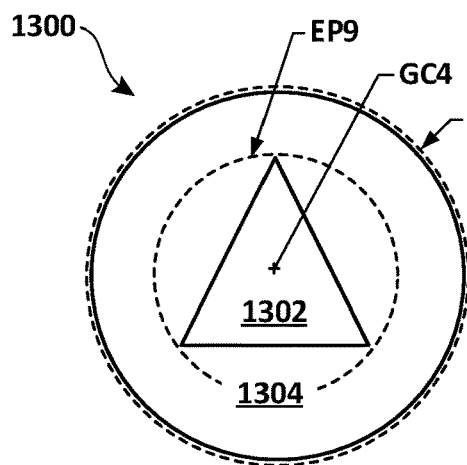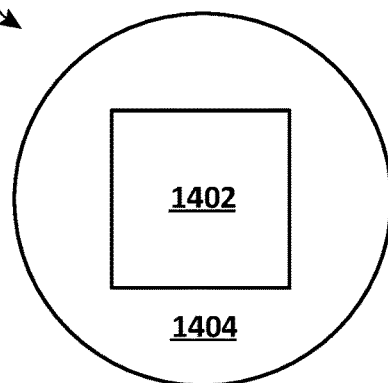
FIG. 13  FIG. 14
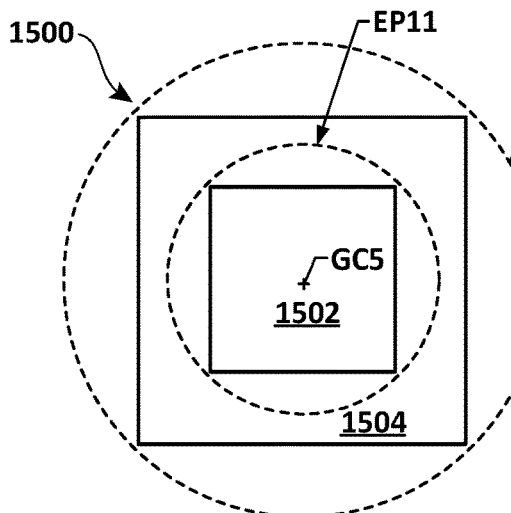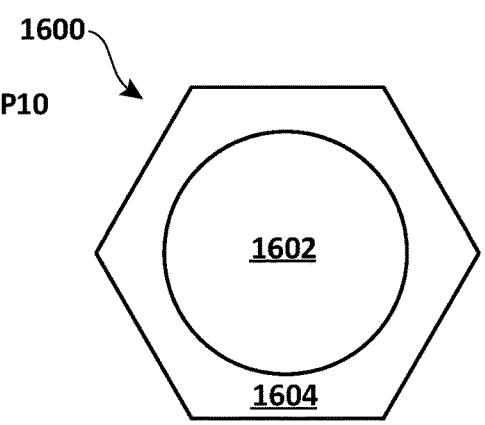
FIG. 15  FIG. 16
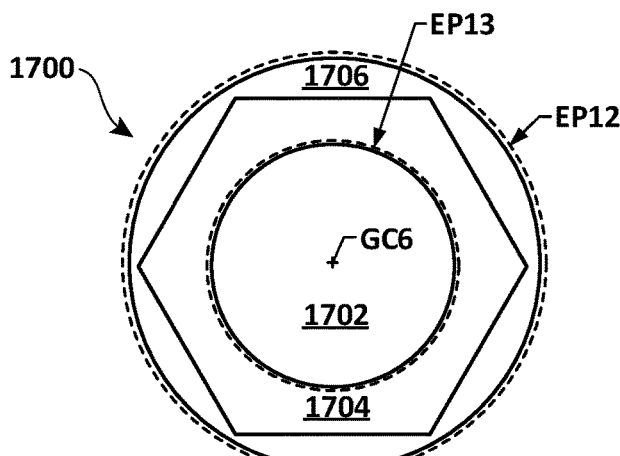
FIG. 17

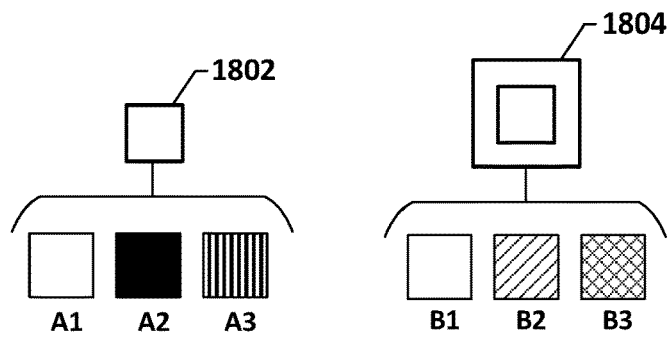
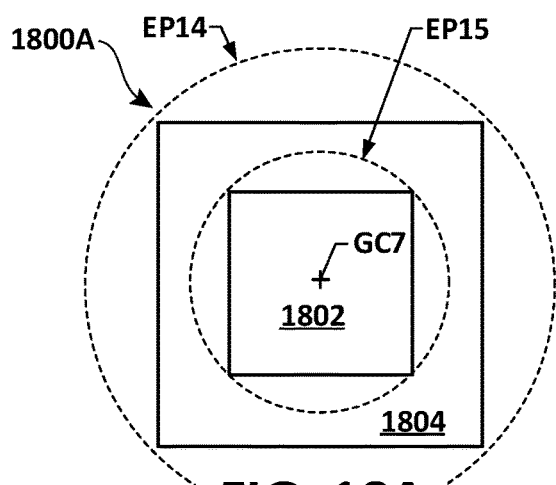
FIG. 18A
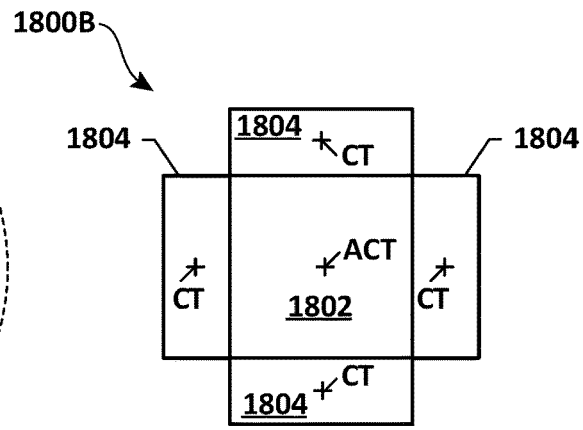
FIG. 18B
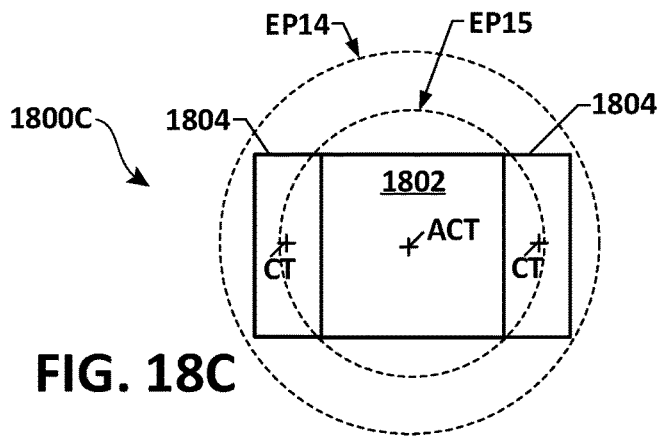
FIG. 18C
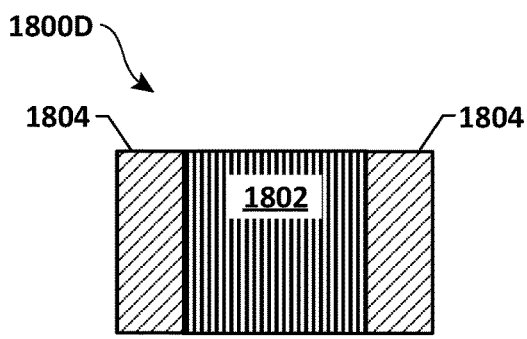
FIG. 18D
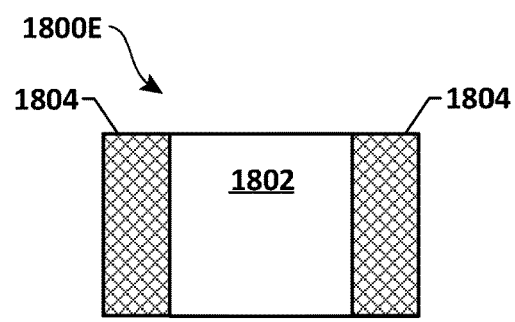
FIG. 18E

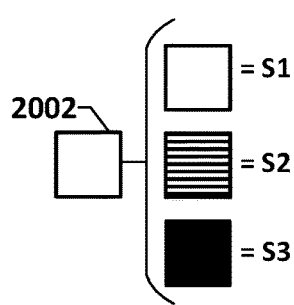
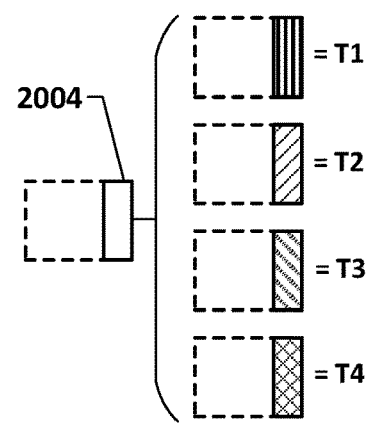
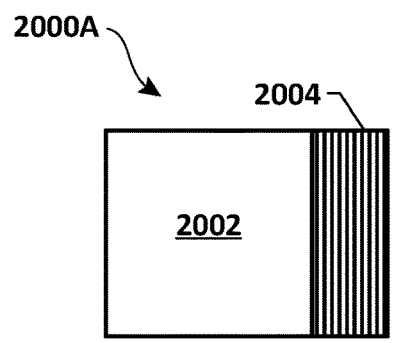
FIG. 20A
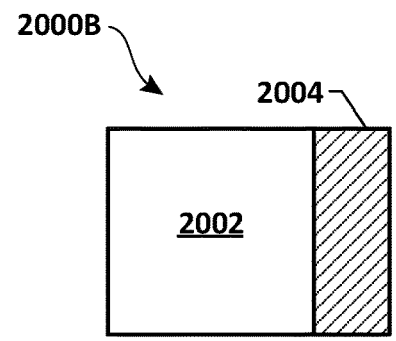
FIG. 20B
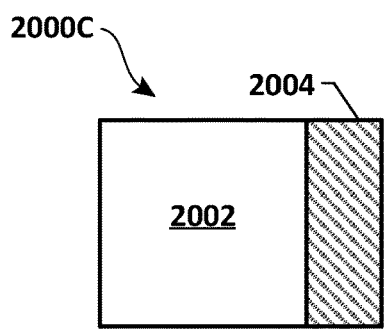
FIG. 20C
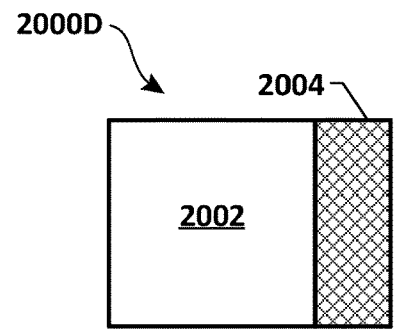
FIG. 20D
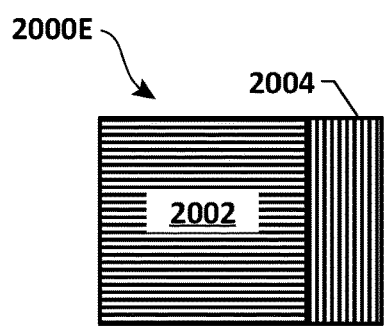
FIG. 20E
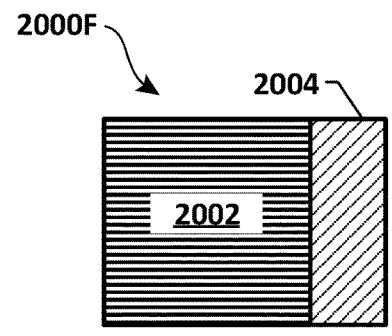
FIG. 20F

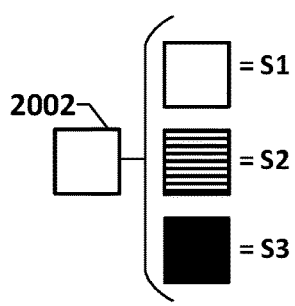
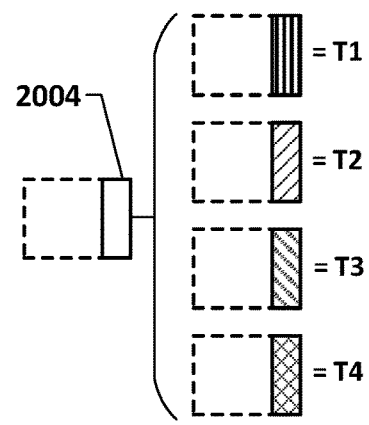
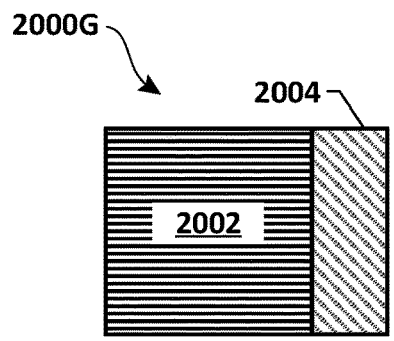
FIG. 20G
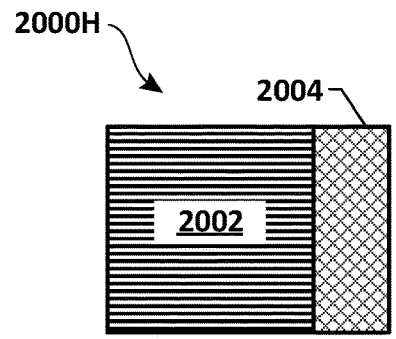
FIG. 20H
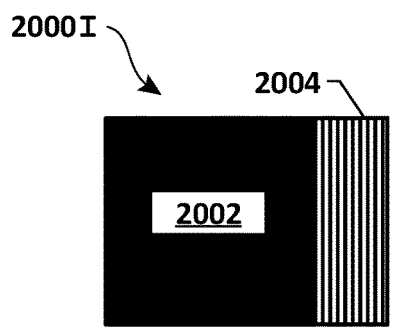
FIG. 20I
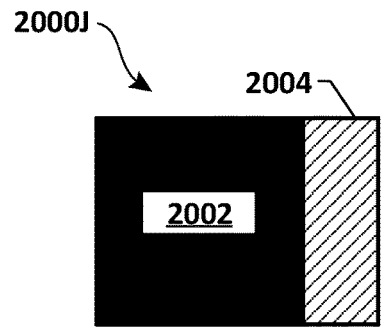
FIG. 20J
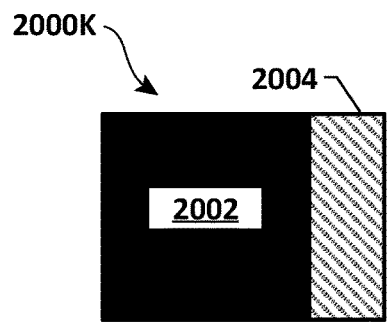
FIG. 20K
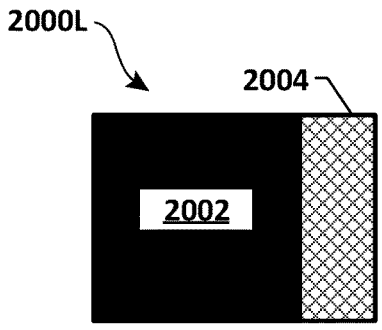
FIG. 20L

MULTISTATE PRESENCE AND RESPONSIVENESS TRACKING AND INDICATION

TECHNICAL FIELD

This disclosure relates generally to communicating and viewing presence and responsiveness data and, more particularly, to host tracking of object persons and providing client display of presence and responsiveness via multi-state single indicators.

BACKGROUND

There are benefits in having information on other persons' presence or absence from given locations. For example, when an unexpected need to meet with a visitor arises, a quick determination of who is present, and who is both present and available, would often be helpful. Benefits of such information, if available, would include reduced loss of time spent calling around, reduced stress, and capability of better informed selection of groups. Similarly, having information on other persons' responsiveness to remote communication, e.g., quality of their respective connections, their available time slots, would likely be helpful.

There are technical issues, though, in presenting such information. One such issue is how to select, arrange and present the information such that recipients' needs for information are met, without overloading the recipient.

For example, one technique for updating persons as to presence and responsiveness of others is to construct a list of persons and display adjacent each name a string of ON-OFF icons This technique can present various technical issues. For example, visually tracking multiple ON-OFF conditions next to each name in a lengthy list can be fatiguing. Another technique is to display a list of object persons and arrange adjacent each name a text or a dialog block into which textual description of the person's presence and responsiveness can be maintained. Technical issues that can arise include the amount of time required to read the text.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An example of disclosed systems can include a processor and a memory coupled to the processor, the memory storing instructions that when executed by the processor cause the processor to receive from a network, via a network interface coupled to the system, data indicative of a current presence status, data indicative of a current responsiveness status, and an information associating an object person identifier with the current presence status and current responsiveness status, wherein the presence status being a status of physical location relative to a given reference, and the responsiveness status being a status of responsiveness relative to a given group of communication resources, and based at least in part on said data, display, on a display coupled to the system, an indicator image that includes a first region and a second region according to a mutual spatial structure, and concurrently displays the first region with a first state appearance and the second region with a second state appearance, the first state appearance indicating the current presence status, and the second state appearance indicating the current responsiveness status, and one among the first region and second region surrounds the other among the first region and second region.

An example of disclosed methods can include a method for visibly tracking presence and responsiveness, which can comprise receiving, from a network, data indicative of a current presence status, data indicative of a current responsiveness status, and an information associating an object person identifier with the current presence status and current responsiveness status; and based at least in part on said data, displaying on a display coupled to the system an indicator image that includes a first region and a second region according to a mutual spatial structure, and concurrently displays the first region with a first state appearance and the second region with a second state appearance, the first state appearance indicating the current presence status, and the second state appearance indicating the current responsiveness status, the presence status being a status of physical location relative to a given reference, and the responsiveness status being a status of responsiveness relative to a given group of communication resources.

An example of disclosed non-transitory computer readable media can include stored instructions that, when executed, can cause a programmable device to receive data indicative of a current presence status, data indicative of a current responsiveness status, and an information associating an object person identifier with the current presence status and current responsiveness status; and based at least in part on said data, display, on a display, an indicator that includes first region and a second region according to a mutual spatial structure, and concurrently displays the first region with a first state appearance and the second region with a second state appearance, the first state appearance indicating the current presence status, and the second state appearance indicating the current responsiveness status.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 3A-3I show example presence-responsiveness indication states of the dual state single indicators in the FIG. 2 client-side dashboard.

FIG. 4 shows another implementation of a client-side dashboard that includes dual state single indicators of current presence-responsiveness, in respective states presenting alternative user-visible indications of the example current presence status and current responsiveness status visible in FIG. 2.

FIGS. 6A-6I show example presence-responsiveness indication states of the single indicators in the FIG. 5 client-side dashboard.

FIG. 7 shows an implementation of a client-side dashboard that includes finer granularity dual state single indicators of current presence-responsiveness, for visible tracking of object persons' presence and responsiveness status, in systems and methods in accordance with the present disclosure.

FIGS. 8A-8F show examples of presence-responsiveness indication states of the finer granularity dual state single indicators in the FIG. 7 client-side dashboard.

FIGS. 9A-9F show examples of presence-responsiveness indication states of the finer granularity dual state single indicators in the FIG. 7 client-side dashboard.

FIGS. 10A and 10B show one implementation of a dual state single indicator of current presence-responsiveness, with a temporal responsiveness indication, for visible tracking of object persons' presence and responsiveness status, in systems and methods in accordance with the present disclosure.

FIGS. 11A-11I show examples of temporal responsiveness indications, on example presence-responsiveness status indication states of dual state single indicators in accordance with the present disclosure.

FIGS. 12A-12D illustrate specific example values of temporal responsiveness indications, on example presence-responsiveness status indication states formed by dual state single indicators in accordance with the present disclosure.

FIG. 13 illustrates one example triangle-circle configuration of polygon-ellipse dual state single-indicator for tracking, distribution, and visible presentation of object persons' presence-responsiveness status in accordance with the present disclosure.

FIG. 14 illustrates one example square-circle configuration of another implementation of a polygon-ellipse dual state single-indicator, for tracking, distribution, and visible presentation of object persons' current presence-responsiveness status in accordance with the present disclosure.

FIG. 15 illustrates an example square-square configuration of an implementation of a polygon-polygon dual state single-indicator, for tracking, distribution, and visible presentation of object persons' current presence-responsiveness status in accordance with the present disclosure.

FIG. 16 illustrates an example circle-hexagon configuration of one implementation of a polygon-ellipse dual state single-indicator, for tracking, distribution, and visible presentation of object persons' current presence-responsiveness status in accordance with the present disclosure.

FIG. 17 illustrates an example circle and hexagon-circle configuration of one implementation of an ellipse with polygon-ellipse dual state single-indicator, for tracking, distribution, and visible presentation of object persons' current presence-responsiveness status in accordance with the present disclosure.

FIG. 18A illustrates another example square-square implementation of a polygon-polygon dual state single-indicator for tracking, distribution, and visible presentation of object persons' current presence-responsiveness status in accordance with the present disclosure FIG. 18B illustrates an example segmented second region configuration of the FIG. 18A square-square implementation.

FIG. 18C illustrates an example further segmented second region configuration of the FIG. 18A implementation with example graphical reference markings superposed, illustrating various features of mutual spatial structure of the first region and segmented second region, in accordance with the present disclosure.

FIGS. 18D and 18E illustrate respective first region and second region appearances, visibly indicating two example presence-responsiveness statuses in accordance with the present disclosure.

FIGS. 20A-20L illustrate eight respective first region and second region appearances, in an example of another implementation of a mutual spatial structure dual state single indicators of current presence-responsiveness, in accordance with the present disclosure.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, known methods, procedures, components, and/or circuitry have been described at a relatively high-level, without detail, in order to avoid unnecessarily obscuring aspects of the present teachings.

As will be understood by persons of skill in the art upon reading this disclosure, benefits and advantages provided by implementations can include, but are not limited to, a solution to the technical problems of inability to provide clients visible, readily understandable update of current presence status and current responsiveness status of each of a plurality of object persons. Technical solutions and implementations provided here improve the user experience in receiving presentation of current presence status and current responsiveness status of user-specifiable persons, and of persons identified and listed to the user through automatic requirement-based personnel list construction.

Figure 1:
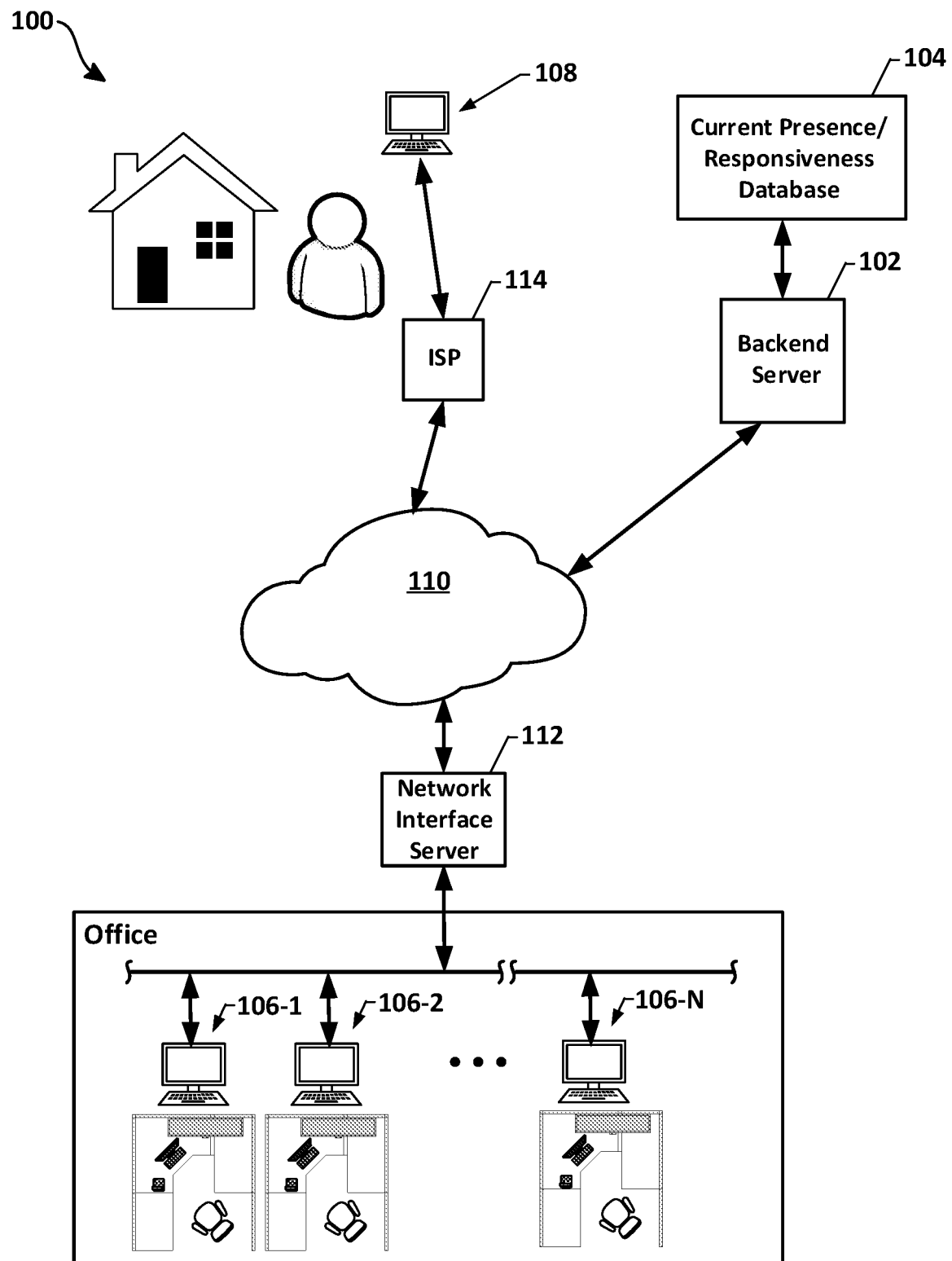
FIG. 1 shows a functional block diagram of one example system upon which aspects of this disclosure may be implemented.

FIG. 1 illustrates an example system 100, upon which aspects of this disclosure may be implemented. The system 100 can include a back-end server 102 that can be coupled to a presence-responsiveness status (PRS) database 104 that can store presence status and responsiveness status (not separately visible in FIG. 1) for each of a plurality of persons. The persons will be referred to as "object persons."

It will be understood that PRS database 104 is a logic resource and the graphic box 104 representation does not define a hardware or architecture. The PRS database 104 can be implemented, for example, as a "cloud resource." It will also be understood that the presence status and the responsiveness status are not necessarily stored together.

The system 100 may include a plurality of participant client devices, such as the example office-based clients 106-1, 106-2, . . . , 106-N (collectively "clients 106"), and home office client 108. The clients 106 may connect to a network 110, such as the Internet, through a network interface server 112. The home office client 108 may connect to the network 100 through, for example, an Internet Service Provider (ISP) 114. The network 110 may be a wired or wireless network(s) or a combination of wired and wireless networks that connect one or more elements of the system 100.

The client devices 106 and 108 can be personal or handheld computing devices having or being connected to both input and output elements. For example, client devices 106 and 108 may be one of: a mobile telephone; a smart phone; a tablet; a phablet; a smart watch; a wearable computer; a personal computer; a desktop computer; a laptop computer; a gaming device/computer; a television; and the like. This list is for example only and is not intended as any limitation on the scope of implementations of any client devices 106 or 108.

Figure 2:
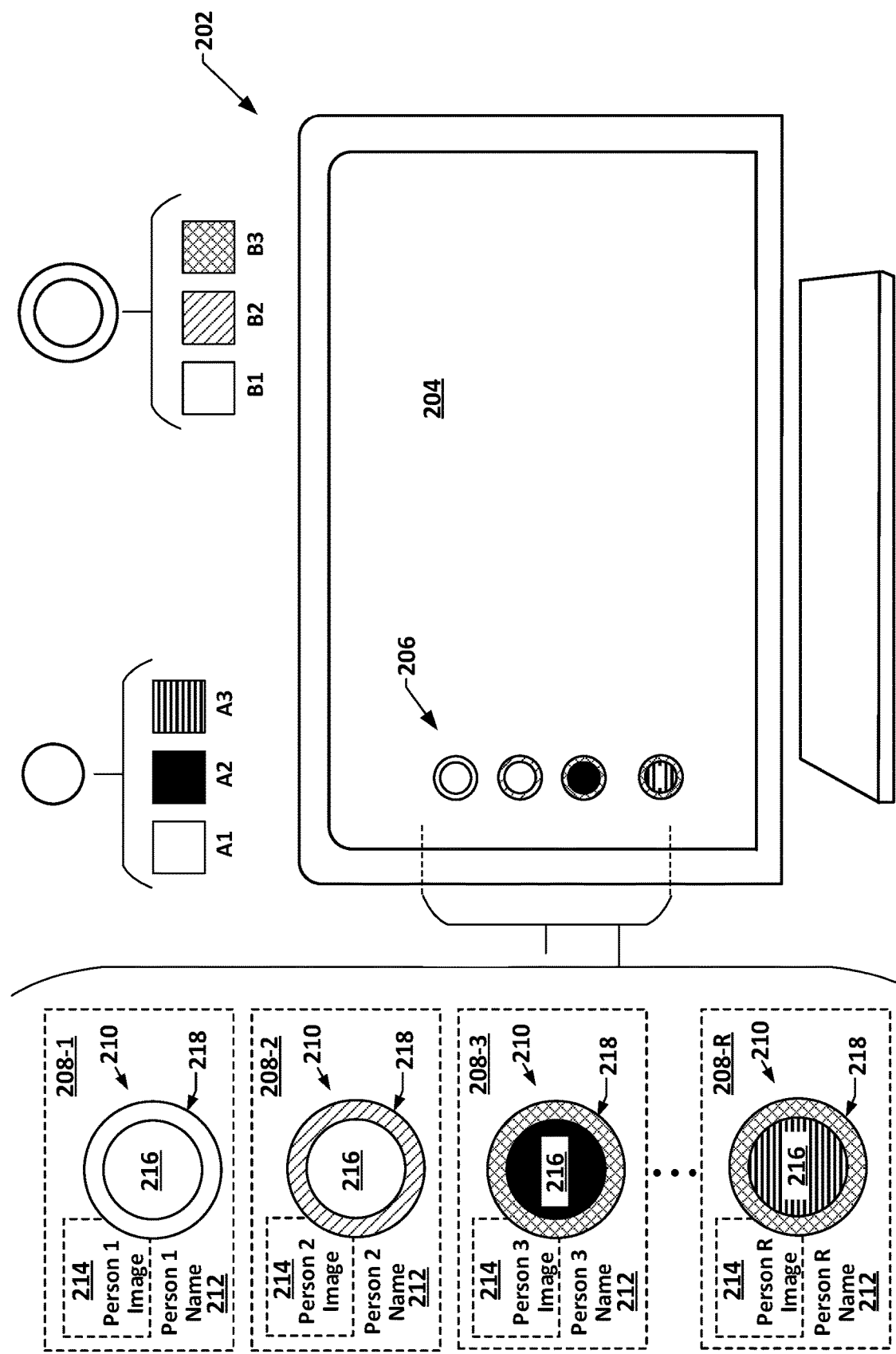
FIG. 2 shows one implementation of a client-side dashboard that includes dual state single indicators of current presence-responsiveness, in respective states presenting user-visible current presence status and current responsiveness status of each of an example plurality of object persons, for visible presence-responsiveness tracking systems and methods in accordance with the present disclosure.

FIG. 2 illustrates portions of an example client device 200, for example, any of the client devices 106 or 108, that includes a user interface (UI) screen 202, having a general display region 204 and a single indicator presence-accessibility dashboard 206. The dashboard 206 can include a plurality of dual state single indicators, exampled of which are visible on the FIG. 2 general display region 204. Described features and operations can be provided, for example, by a processor (not explicitly visible in FIG. 2) included in or associated with the client device, which can be coupled to the UI screen 202 and to a memory (not explicitly visible in FIG. 2) that can store executable instructions that when executed by the processor can cause the processor to implement the described features and operations.

An expanded detailed view of one example implementation of dashboard 206, and an arbitrary example display state of the implementation, appears to the left of the UI screen 202. Referring to the expanded view, the dashboard 206 can include a first presence-responsiveness status block 208-1, a second presence-responsiveness status block 208-2, and a third presence-responsiveness status block 208-3, among an arbitrary integer R instances, of which an Rth presence-responsiveness status block 208-R is visible. Each of the first, second, and third through Rth presence-responsiveness status blocks, 208-1, 208-2, 208-3, . . . , 208-R (referenced generically as "PR status block(s) 208") includes a presence-responsiveness status dual state single indicator 210 (hereinafter "the DS single indicator 210"). Each PR status block 208 can include an object person name field 212 and object person image 214. FIG. 2 shows generic name examples of "Person 1 Name, Person 2 Name, . . . , Person R Name" in the object person name fields 212.

Each PR DS single indicator 210 can include a first region 216 and a second region 218. In an implementation, first region 216 and second region 218 can be configured with a mutual spatial structure.

The phrase "mutual spatial structure," as used herein in the context of any first region A and second region B, means: region A and region B are concurrently displayed, region A with a first state appearance and region B with a second state appearance, the first state appearance indicating the current presence status, and the second state appearance indicating the current responsiveness status, with respective displayed geometries wherein: i) a geometric center of one of region A and region B is within an encompassing perimeter of the other of region A and region B, or ii) a geometric centroid of one of region A and region B is within an encompassing perimeter of the other of region A and region B, or iii) an encompassing perimeter of one of region A and region B is within an encompassing perimeter of the other of region A and region B, or iv) the geometric centroid of one of region A and region B is with an encompassing perimeter of the other of region A and region B, or v) one of region A and region B at least partially surrounds or at least partially encompasses the other of A and B, or vi) the first state appearance directly borders the second state appearance, or any combination or sub-combination of (i) through (vi).

The term "encompassing perimeter," as used herein in the context of a region, e.g., a first region or a second region, means a minimum radius circular perimeter that encompasses the region.

Referring to FIG. 3A, which shows an enlarged view of FIG. 2 block 208-1 PR DS single indicator 210, features of the first region 216 and second region 218 in accordance with mutual spatial structure include, for example, the geometric center (e.g., the example reference point labelled "GC" on PR status block 208-1) of the first region 216 being within an encompassing perimeter (e.g., the example reference perimeter line labeled "EP2" on PR status block 208-1) of the second region 218. Since the example first region 216 has a circular perimeter, its geometric centroid is the same as its geometric center GC. Accordingly, another feature of first and second region 216 and 218 in accordance with mutual spatial structure includes the geometric centroid of 216 being within the encompassing perimeter EP2 of 218. In addition, an encompassing perimeter (e.g., the example reference perimeter line labeled "EP1" on PR status block 208-1) is within an encompassing perimeter EP2 of 218. Also, as visible in FIG. 2, the second region 218 at least partially surrounds or at least partially encompasses the first region 218.

Operations described in greater detail in later sections of this disclosure can include setting or selecting an appearance of the first region 216 to one among a given group of different first region appearances and setting an appearance of the second region 218 to one among a given group of different second region appearances. In an implementation, the given group of different first region appearances can be referenced as a first group, and the given group of different second region appearances can be referenced as a second group. Accordingly, in one example, the setting of the first region 216 and second region 218 can then be implemented as setting the appearance of the first region 216 as a first color among a first group of colors and setting the appearance of the second region 218 as a second color among a second group of colors. Alternatively, setting of the first region 216 and second region 218 can be implemented as setting the appearance of the first region 216 as a visible pattern among a first group of visible patterns and setting the appearance of the second region 218 as a second visible pattern among a second group of visible patterns. The two described examples are not mutually exclusive. For example, the setting of the first region 216 and second region 218 can be implemented as setting the appearance of the first region 216 as a first combination color-pattern among a first group of combination color-patterns and setting the appearance of the second region 218 as a second combination color-pattern among a second group of combination color-patterns.

For purposes of description, and example group of three appearances of first region 216 will be assumed, and these will be referenced as a first region first appearance A1, a first region second appearance A2, and a first region third appearance A3. Table 1 below presents example definitions for each the example first, second, and third appearance state, respectively referenced as A1, A2, and A3. Each of the example appearances A1, A2, and A3 is visible on FIG. 2 as a particular one among a group of three color-patterns that are represented in the FIG. 2 legend as a solid white fill, a solid black fill, and a particular cross-hatch. It will be understood that the solid black, solid white, and cross hatch are not respective specifications of actual appearances. On the contrary, solid black represents one particular color-pattern fill, solid white represents another particular color-pattern fill, and the cross-hatch represents another particular color-pattern fill. In one example implementation, the color-pattern represented by the solid white fill can be solid green, the color-pattern represented by the solid black fill can be solid yellow, and the color-pattern represented by the cross hatch fill can be solid red. Any of the three can be solid white or solid black. The colors green, yellow, and red are only for purposes of example, and are not to be understood as limitations, or as preferred implementations.

TABLE 1

| First Region 216 Appearance | PID Presence Status |
|---|---|
| A1 | Present, face-time accessible. |
| A2 | Not Present |
| A3 | Present, not face-time accessible. |

An example set of three appearances from which the appearance state of second section 218 can be selected can include a second region first appearance B1, a second region second appearance B2, and a second region third appearance B3.

Table 2 below shows, for each of these three, i.e., B1, B2, and B3, second region 218 appearance states, an example of corresponding meaning in terms of the tracked object person's responsiveness status.

TABLE 2

| Second Region 218 Appearance | PID Responsiveness Status |
|---|---|
| B1 | Not Responsive |
| B2 | Responsive Only to Phone |
| B3 | Responsive Only to IM |

FIG. 2 includes a fill legend (hereinafter "FIG. 2 example legend") that assigns to each of the first region 216 appearance states A1, A2, and A3 a different fill from among a given set of three different fills, assigns to each of the second region 218 appearance states B1, B2, and B3, a different fill from among another given set of three different fills.

As described above for A1, A2, and A3, it will be understood that the appearance states visible in the FIG. 2 legend as corresponding to B1, B2, and B3 are not respective limitations or specifications of actual visible appearances. Instead, each represents a particular color-pattern fill from among a group of three color-patterns. This will be understood to apply for all representations of the form XY, with "X" being a letter and "Y" being a numeral.

Referring to FIG. 2, including the expanded detailed view to the left of the UI screen 202, and the FIG. 2 fill legend, it is seen that the example PR DS single indicator 210 of the first PR status block 208-1 has fill A1 in its first region 216 and fill B1 in its second region 218. For purposes of description, this combination can be referenced as "A1-B1." Looking at Tables 1 and 2, it can be seen that the presence-responsiveness status indicated by A1-B1 is "Not Present" and "Not Responsive."

The above-described example quantity of three appearances for the first region 216, as well as three appearances for the second region 218, are for only purposes of example and are not intended as a limitation. For example, if it is desired to specify the object person's presence status with a finer granularity than just three statuses, the number of different appearances allocated for use by the first region 216 can be made greater than three. As illustration, if it is desired to distinguish between "not present, with certainty" as opposed to "whereabouts unknown," one implementation can include additional fill(s), i.e., additional colors, patterns, or combination color-patterns. Alternatively, or additionally, a higher dimensionality of appearance states can be allocated for use by the first region 216, or by the second region 218, or both. For example, one or both of the first region 216 appearance and second region 218 appearance can be defined by a pattern, color, or combination color-pattern, in combination with a brightness level. The brightness states can be, for example, a binary "high"/"low." Applying such binary high/low brightness, for example, to the first region 216 appearance, the given example set A1, A2, and A3 can then be expanded to a larger set (not visible in FIG. 2), such as a hypothetical "A1L," "A1H," "A2L," "A2H," "A3L," and "A3H," with "L" signifying a low brightness and "H" signifying a high brightness. Such a feature can be a technical solution, for example, to the above-described issue of distinguishing between "not present, with certainty" and "whereabouts unknown." For example, the low brightness state of A1, "A1L" can indicate "whereabouts unknown," and the high brightness state, "A1B," can indicate "not present, with certainty."

Referring to FIG. 2 and the FIG. 2 example legend it can be seen that first region 216 of the PR DS single indicator 210 of the second PR status block 208-2 has fill A1, and the FIG. 2 second region 218 of block 208-2 has fill B2. Referring to Table 1 and Table 2, it is seen that the presence-responsiveness status dual state single indicator 210 of PR status block 208-2, with its appearance A1-B2, indicates Person 2 is "Not Present" and "Responsive Only to Phone."

Referring to FIG. 2, the FIG. 2 example legend, and Tables 1 and 2, it is seen that the respective PR DS single indicator 210 of PR status block 208-3, by its appearance A1-82, indicates Person 3 is "Present" and "Responsive Only to IM," and the PR DS indicator 210 of PR status block 208-R indicates, by its appearance A3-B3, that Person R is "Present, Not Face Time Accessible" and "Responsive Only to IM."

It will be understood that the FIG. 2 illustrated position and scale of the dashboard 206, and the vertical top-down arrangement of its PR status blocks 208, are for only purposes of example and are not intended as any limitation on practices according to this disclosure. In addition, implementation can include user-selectable positioning of the dashboard 206, user-selectable scaling of the dashboard 206, or both. Implementations can also include selective zoom of portions of the dashboard 206, and selective full-screen view of the dashboard.

FIGS. 3A-3I show the universe, based on Table 1 and Table 2, of presence-responsiveness indication statuses that can be indicated by each of the PR DS single indicators 210 in the FIG. 2 client-side dashboard 206. For convenience, the FIG. 2 legend is reproduced above FIGS. 3A-3I.

FIG. 3A shows an enlarged view of FIG. 2 block 208-1 PR DS single indicator 210. As described above and as visible in the figures, PR status block 208-1 PR DS single indicator 210 has appearance state A1-B1 and, referring to Tables 1 and 2, the presence-responsiveness status indicated by A1-B1 is "Not Present" and "Not Responsive." FIG. 3B shows an enlarged view of FIG. 2 PR status block 208-2 PR DS single indicator 210 and its above-described appearance state A1-B2, i.e., for this example, indicative of "Not Present" and "Responsive Only to Phone." Referring to the FIG. 2 example legend, the appearance of the FIG. 3C PR DS single indicator 210 is seen as A1-B3. Referring to the example Tables 1 and 2, this is seen to indicate "Not Present" and "Responsive Only to IM." Regarding the FIG. 3D enlargement, the appearance state of FIG. 3D PR DS single indicator 210 is A2-B1, which as shown in Tables 1 and 2 indicates "Present" and "Not Responsive." Referring to FIG. 3E and the FIG. 2 example legend, the visible appearance state of its PR DS single indicator 210 is A2-B2, which, as shown in Tables 1 and 2, indicates "Present" and "Responsive Only to Phone." Referring to FIG. 3F and the FIG. 2 example legend, the FIG. 3 appearance state of the PR DS single indicator 210 is A2-B3, which, as shown in Tables 1 and 2, indicates "Present" and "Responsive Only to IM." Referring to FIG. 3G and the FIG. 2 example legend, the appearance state of the FIG. 3G PR DS single indicator 210 is A3-B1. Referring to Tables 1 and 2, appearance state A3-B1 is "Present, But Not Face Time Accessible" and "Not Responsive." Referring to FIGS. 3H and 3I and the FIG. 2 example legend, the appearance state of the FIG. 3H PR DS single indicator 210 is seen as A3-B2, and the appearance state of the FIG. 3I PR DS single indicator 210 is seen as A3-B3. Looking to Tables 1 and 2 it is seen that the FIG. 3H PR DS single indicator 210 indicates "Present, But Not Face Time Accessible" and "Responsive Only to Phone," and the FIG. 3I PR DS single indicator 506 indicates "Present, But Not Face Time Accessible" and "Responsive Only to IM."

FIG. 4 shows an implementation of a client-side dashboard 402 that includes PR DS single indicators of current presence-responsiveness having effectively reversed roles for the first region and second region. The dashboard 402 can include presence-responsiveness status blocks 404-1, 404-2, 404-3, . . . , 404-N (collectively "presence-responsiveness status blocks 404" or "blocks 404"). Each of the blocks 404 can include a presence-responsiveness status dual state single indicator 406 ("hereinafter alternatively referenced as "PR DS single indicator 406"), an object person name field 408, and object person image 410. Each PR DS single indicator 406 can include a first region 412 and a second region 414, having a mutual spatial structure, shown as the second region 414 surrounding the first region 412.

The PR DS single indicators 406 can be generally structured according to the FIG. 2 PR dual state indicators 210, but with a reversal of their constituent regions' indication functions. More specifically, the second region 414 appearance indicates the object person's current presence status, which is the function performed by the FIG. 2 first region 216. The first region 412 appearance indicates the object person's current responsiveness status, which is the indication function performed by the FIG. 2 second region 218. The following Table 3 shows a mapping of the first region 412 appearance to the object person's current responsiveness status, and Table 4 shows a mapping of the second region 414 appearance to the object person's current presence status.

TABLE 3

| First Region 412 Appearance | PID Responsiveness Status |
|---|---|
| C1 | Not Responsive |
| C2 | Responsive Only to Phone |
| C3 | Responsive Only to IM |

TABLE 4

| Second Region 414 Appearance | PID Presence Status |
|---|---|
| D1 | Present, Face-Time accessible. |
| D2 | Not Present |
| D3 | Present, Not Face-Time accessible. |

Since the FIG. 4 first region 412 and second region 414 have relative geometry comparable to the FIG. 2 first region 216 and second region 218, regions 412 and 414 have respective features in accordance with mutual spatial structure as described above in reference to 216 and 218.

Figure 5:
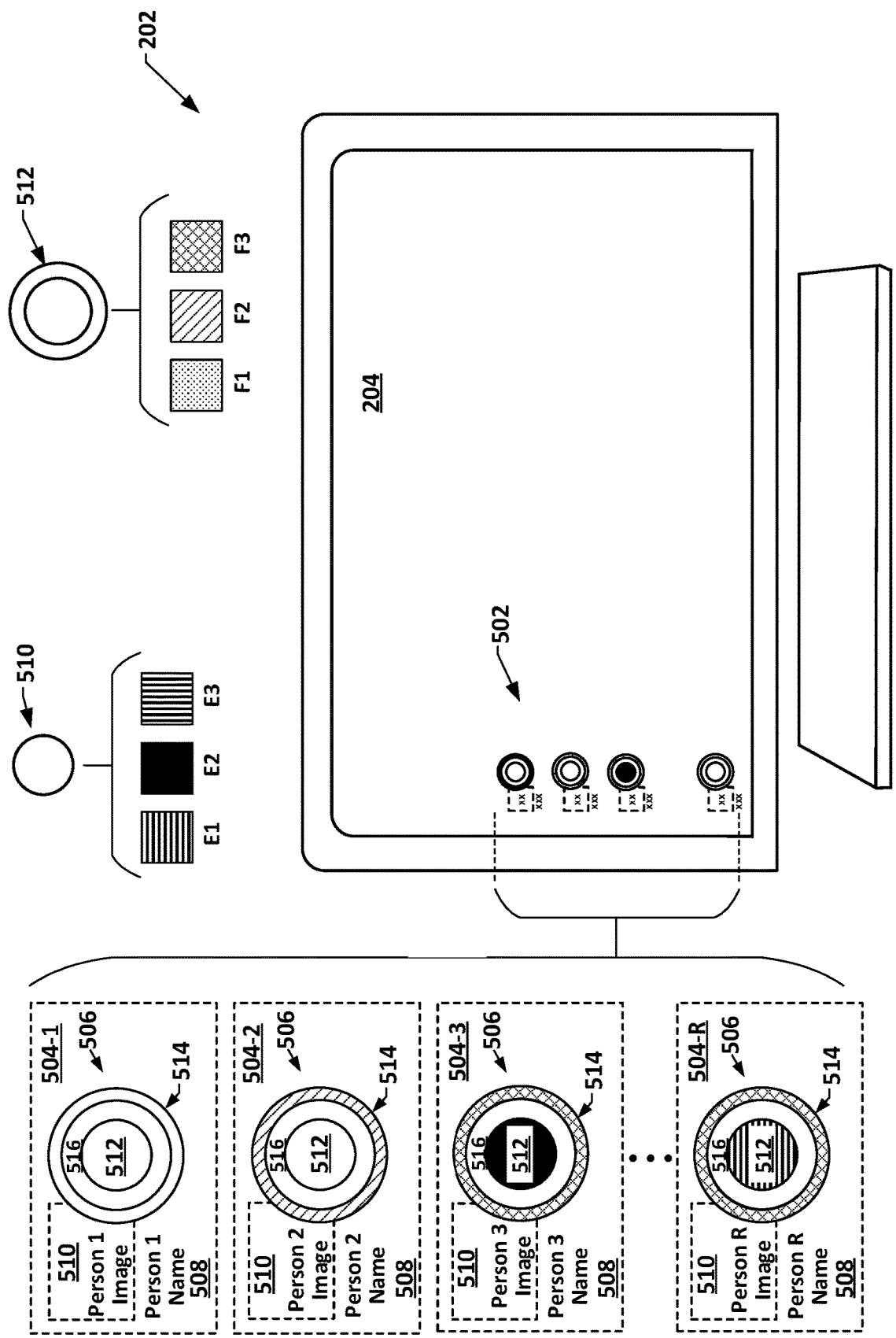
FIG. 5 shows another implementation of a client-side dashboard that includes example modified dual state single indicators of current presence-responsiveness, presenting variations of the FIG. 2 user-visible indications of the example current presence status and current responsiveness status.

FIG. 5 shows another implementation of a client-side dashboard 502, which can include dual state single indicators of current presence-responsiveness status having a first region of comparable function and structure to the FIG. 2 first region 216, and a second region having the same functionality as the FIG. 2 second region 218, with a spacing between the first region and second region. The visible example dashboard 402 can include presence-responsiveness status blocks 504-1, 504-2, 504-3, . . . , 504-R (collectively "presence-responsiveness status blocks 504" or "blocks 504"). Each block 504 can include a presence-responsiveness status dual state single indicator 506 ("hereinafter alternatively referenced as "PR DS single indicator 506"), an object person name field 508 and object person image 510. As visible in FIG. 5 each presence-responsiveness status dual state single indicators 506 can include a first region 512, configured in a mutual spatial structure with a second region 514. Example features of the FIG. 5 first region 512 and second region 514 in accordance with mutual spatial structure are described in greater detail, in reference to FIB. 6B, at later sections of this disclosure. In the example visible in FIG. 5, the first region 512 can be surrounded or encompassed, at least in part, by the second region 514, which can be spaced from the first region 512 by spacing 516. One implementation of such "spacing," in this context, can be solid fill. The solid fill can be configured as a particular color or, for example, white. Selection bases for the fill of spacing 516 can include, for example, without limitation, contrast with in-operation appearances of the first region 512 and second region 514.

FIG. 6A shows a larger scale view of the PR DS single indicator 506 in the same display state as the PR DS single indicator 506 within the FIG. 5 block 504-1. Reference numbers on FIG. 5A are consistent with FIG. 5. Referring to FIG. 6A, an example spacing is numbered 516. The spacing 516 is shown formed as an annular space between the first region 512 outer perimeter (visible but not separately numbered) and second region 514 inner perimeter (visible but not separately numbered). It will be understood that the FIG. 5 annular form of spacing 516 is only an example, and other forms can be used. Non-limiting examples are described in reference to FIGS. 13-17, in later sections of this disclosure.

Referring to FIG. 6B, features of the first region 512 and second region 514 in accordance with mutual spatial structure include, for example, the geometric center of the first region 512, e.g., the example reference point labelled "GC1," being within an encompassing perimeter, e.g., the example reference perimeter line labeled "EP3" of the second region 514. Since the example first region 512 has a circular perimeter, its geometric centroid is the same as its geometric center GC1, and therefore another feature of first and second region 512 and 514 in accordance with mutual spatial structure includes the geometric centroid of 512 being within the encompassing perimeter EP3 of 514. In addition, an encompassing perimeter (e.g., the example reference perimeter line labeled "EP4") of the first section 512 is within the encompassing perimeter EP3 of 512. Also, as visible in FIG. 6B, the second region 514 at least partially surrounds or at least partially encompasses the first region 512.

Technical benefits of the above-described spacing 516 can include, but are not limited to, improved readability of the first region 512 and second region 514, and benefit of a usable setting of 512 and 514 with identical appearance.

The following Table 5 shows one example set of appearances that can be allocated to the first region 512 of the PR DS single indicators 506, and an example mapping of each of the appearances to a corresponding presence status.

TABLE 5

| First Region 512 Appearance | PID Presence Status |
|---|---|
| E1 | Present, face-time accessible. |
| E2 | Not Present |
| E3 | Present, not face-time accessible. |

The following Table 6 shows one example set of appearances that can be allocated to the second region 514 of the PR DS single indicators 506, and an example mapping of each of the appearances to a corresponding responsiveness status.

TABLE 6

| Second Region 514 Appearance | PID Responsiveness Status |
|---|---|
| F1 | Not Responsive |
| F2 | Responsive Only to Phone |
| F3 | Responsive Only to IM |

A legend (hereinafter "the FIG. 5 legend") appears at an upper portion of FIG. 5, and at an upper portion of each of FIGS. 6A-6I. The FIG. 5 legend maps the FIG. 5 and FIG. 6A-6I appearances of the first region 512 to values E1, E2, E3 in Table 5, and maps appearances of the second region 514 to values F1, F2, F3 in Table 6. As described above, it will be understood that the appearance states visible in the FIG. 5 legend as corresponding to E1, E2 E3, F1, F2, and F3 are not respective limitations or specifications of actual visible appearances, as each represents a particular color-pattern fill from among a group of three color-patterns.

FIG. 6A combined with FIGS. 6B-6I show an example larger universe of presence-responsiveness indication states, which can be enabled by the mappings of Tables 5 and 6.

Referring to FIG. 6A and the FIG. 5 legend, the appearance state of the figure's PR DS single indicator 506 is E1-F1. Therefore, looking at Tables 5 and 6, the FIG. 6A PR DS single indicator 506 indicates a presence-responsiveness status of "Present, face time accessible"—"Not Responsive." Referring to FIG. 6B and the FIG. 5 legend, the FIG. 6B PR DS single indicator 506 has appearance state E1-F2. Therefore, referring to Tables 5 and 6, the FIG. 6B PR DS single indicator 506 indicates a presence-responsiveness status of "Present, face time accessible"—"Not Responsive." Referring to FIG. 6C and the FIG. 5 legend, the FIG. 6C PR DS single indicator 506 has appearance state E1-F2, which, looking at Tables 5 and 6, shows the FIG. 6C PR DS single indicator 506 indicates a presence-responsiveness status of "Present, face time accessible"—"Not Responsive." Referring to FIG. 6D and the FIG. 5 legend, the FIG. 6D PR DS single indicator 506 has appearance state E1-F2, which, looking at Tables 5 and 6, shows the FIG. 6D DS single indicator 506 indicates a presence-responsiveness status of "Present, face time accessible"—"Not Responsive." Referring to FIG. 6E and the FIG. 5 legend, the FIG. 6E PR DS single indicator 506 FIG. 6E PR DS single indicator 506 has appearance state E1-F2, which, looking at Tables 5 and 6, shows the FIG. 6E PR DS single indicator 506 indicates a presence-responsiveness status of "Present, face time accessible"—"Not Responsive."

Referring to FIG. 6F and the FIG. 5 fill state-to-appearance-state legend, the FIG. 6E PR DS single indicator 506 has appearance state E1-F2, which, looking at Tables 5 and 6, shows the FIG. 6E PR DS single indicator 506 indicates a presence-responsiveness status of "Present, face time accessible"—"Not Responsive." Referring to FIG. 6G and the FIG. 5 legend, the FIG. 6E PR DS single indicator 506 has appearance state E1-F2. Therefore, looking at Tables 5 and 6, the FIG. 6E PR DS single indicator 506 indicates a presence-responsiveness status of "Present, face time accessible"—"Not Responsive." Referring to FIG. 6H and the FIG. 5 legend, the FIG. 6H PR DS single indicator 506 has appearance state E1-F2, which, looking at Tables 5 and 6, shows the FIG. 6H PR DS single indicator 506 indicates a presence-responsiveness status of "Present, face time accessible"—"Not Responsive." Referring to FIG. 6I and the FIG. 5 legend, the FIG. 6H PR DS single indicator 506 has appearance state E1-F2, which, looking at Tables 5 and 6, shows the FIG. 6I PR DS single indicator 506 indicates a presence-responsiveness status of "Present, face time accessible"—"Not Responsive."

FIG. 7 shows a client-side dashboard 702 that includes finer granularity dual state single indicators of current presence-responsiveness status. Visible in the enlargement at the left of the figure, example dashboard 702 can include presence-responsiveness status blocks 504-1, 704-2, 704-3, . . . , 704-V (collectively "presence-responsiveness status blocks 704" or "blocks 704"). Each block 704 can include a presence-responsiveness status dual state single indicator 706 ("hereinafter alternatively referenced as "PR DS single indicator 706"), an object person name field 708 and object person image 710. FIG. 8A is a scaled-up depiction of the PR DS single indicator 706 in bock 704-1. Structure of the PR DS single indicators 706 will described in reference to FIG. 8A. Referring to FIG. 8A each indicator 706 can include a first region 802, which can be surrounded or encompassed, at least in part, by a second region (visible, but separately numbered), which can include a first sub-region or ring 804 and second sub-region or ring 806. It will be understood that the term "ring," as used herein, can mean a continuous line or region extending along a circular path, or a segmented line or region extending along a circular path, or any combination or sub-combination thereof.

For purposes of description, the first sub-region 804 and second sub-region 806 will be collectively referenced as "second region 804/806." The second region 804/806 can be spaced from the first region 802 by a first spacing 808. In an implementation, first sub-region 804 and second sub-region 806 of the second region 804/806 can be spaced by a second spacing 810. Implementations of the first spacing 806 and second spacing 810 can be, are not limited to, a solid fill.

Features of the first region 802 and second region 804/806 in accordance with mutual spatial structure can include, for example, the geometric center of the first region 802, e.g., the example reference point labelled "GC2," being within an encompassing perimeter, e.g., the example reference perimeter line labeled "EP5" of the second region 804/806. Since the example first region 802 has a circular perimeter, its geometric centroid is the same as its geometric center GC2, and therefore another feature of first and second region 802 and 804/806 in accordance with mutual spatial structure includes the geometric centroid of 802 being within the encompassing perimeter EP5 of 804/806. In addition, an encompassing perimeter (e.g., the example reference perimeter line labeled "EP6") of the first section 802 is within the encompassing perimeter EP5 of 804/806. Also, as visible in FIG. 8A, the second region 804/806 at least partially surrounds or at least partially encompasses the first region 802.

In one example configuration using the above-described second region, in association with the current responsiveness status indicating being not responsive to communication resources, the second state appearance can include a first particular appearance of the first sub-region or ring 804 of the second region 804/806. For example, referring to the legend on the drawing sheet with FIGS. 8A-8F, in association with the current responsiveness status being not responsive to communication resources, the second state appearance can include the first sub-region region 804, or a variation of 804, having appearance H1.

In the same, or another configuration, in association with the current responsiveness status indicating being responsive to communication resources other than telephone, e.g., IM, concurrent with being not responsive to telephone, the second state appearance can include a second particular appearance of the second region first sub-region or ring 804 concurrent with a first particular appearance of the second region second sub-region or ring 806. Referring again to the legend on the drawing sheet having FIGS. 8A-8F, an implementation of such appearance can include displaying first sub-region 804, or a variation of 804, having appearance H2, in combination with displaying the second sub-region 806 or a variation of 806 with one among I1 and I2.

In the same, or another configuration, in association with the current responsiveness status indicating the object person being responsive to telephone concurrent with other communication resources, the second state appearance can include the second particular appearance of the first ring concurrent with a second particular appearance of the second ring. Referring to the legend on the drawing sheet having FIGS. 8A-8F, an implementation of such appearance can include displaying first sub-region 804, or a variation of 804, having appearance H2, in combination with displaying the second sub-region 806, or a variation of 806 with the other among I1 and I2.

TABLE 7

| First Region 802 Appearance | PID Presence Status |
| --- | --- |
| G1 | Present, face-time accessible. |
| G2 | Not Present |
| G3 | Present, Not face-time accessible. |

TABLE 8

| Second Region 804/806 Appearance | PID Responsiveness Status |
| --- | --- |
| 804 = H1<br>806 = I1 | Responsive to Phone, Responsive to IM, Not Responsive to email. |
| 804 = H1<br>806 = I2 | Responsive to Phone, Responsive to IM, Responsive to email. |
| 804 = H2<br>806 = I1 | Not Responsive to Phone, Responsive to IM, Not Responsive to email. |
| 804 = H2<br>806 = I2 | Not responsive to Phone, Not Responsive to IM, Not Responsive to email. |

Referring to FIGS. 8A-8F, and to Table 7 and Table 8, FIG. 8A shows first region 802 having appearance G1, and second region 804/806 having appearance H2, I2. This indicates the object person being Present, face-time accessible and Not Responsive to Phone, Not Responsive to IM, and Not Responsive to email. FIG. 8B shows first region 802 having appearance G1, and second region 804/806 having appearance H1, I1. This indicates the object person being Present, face-time accessible, and Responsive to Phone, Responsive to IM, Not Responsive to email. FIG. 8B shows first region 802 having appearance G1, and second region 804/806 having appearance H1, I1. This indicates the object person being Present, face-time accessible, and Responsive to Phone, Responsive to IM, Not Responsive to email. FIG. 8C shows first region 802 having appearance G2, and second region 804/806 having appearance H2, I2. This indicates the object person being Not Present, face-time accessible, Not Responsive to Phone, Not Responsive to IM, and Not Responsive to email. FIG. 8D shows first region 802 having appearance G1, and second region 804/806 having appearance H2, I1. This indicates the object person being Present, face-time accessible, and Not Responsive to Phone, Responsive to IM, Not Responsive to email. FIG. 8E shows first region 802 having appearance G3, and second region 804/806 having appearance H1, I1. This indicates the object person being Present, Not face-time accessible, and Responsive to Phone, Responsive to IM, Not Responsive to email. FIG. 8F shows first region 802 having appearance G2, and second region 804/806 having appearance H1, I2, indicating object person being Not Present, and Responsive to Phone, Responsive to IM, Responsive to email.

FIGS. 9A-9F show appearance configurations of one example alternative structure for finer granularity PR DS single indicator. The structure of the examples illustrated in FIGS. 9A-9F is largely the same as the structure of FIGS. 7 and 8A-8F, with the first and second spacings 808 and 810 removed. The resulting structure includes a first or inner region 902, surrounded by a second or outer region (visible, but not separately numbered) that can be formed by a first sub-region 904 surrounded by a second or outer sub-region 906. For purposes of description, the first sub-region 904 and second sub-region 906 will be collectively referenced as "second region 904/906." Features of the first region 902 and second region 904/906 in accordance with mutual spatial structure can include, for example, the geometric center of the first region 902, e.g., the example reference point labelled "GC3," being within an encompassing perimeter, e.g., the example reference perimeter line labeled "EP7" of the second region 904/906. Since the example first region 902 has a circular perimeter, its geometric centroid is the same as its geometric center GC3, and therefore another feature of first and second region 902 and 904/906 in accordance with mutual spatial structure includes the geometric centroid of 902 being within the encompassing perimeter EP7 of 904/906. In addition, an encompassing perimeter (visible as the boundary between 902 and 904, but not separately numbered) of the first region 902 is within the encompassing perimeter EP7 of 904/906. Also, as visible in FIG. 9A, the second region 904/906 at least partially surrounds or at least partially encompasses the first region 902.

The following Tables 9 and 10, instead of Tables 7 and 8, define an example mapping between respective appearances of first regions 902, and second region 904/906 and presence-responsiveness statuses.

TABLE 9

| First Region 902 Appearance | PID Presence Status |
|---|---|
| J1 | Present, face-time accessible. |
| J2 | Not Present |
| J3 | Present, Not face-time accessible. |

TABLE 10

| Second Region 904/906 Appearance | PID Responsiveness Status |
|---|---|
| 904 = K1 906 = L1 | Responsive to Phone, Responsive to IM, Not Responsive to email. |
| 904 = K1 906 = L2 | Responsive to Phone, Responsive to IM, Responsive to email. |
| 904 = K2 906 = L1 | Not Responsive to Phone, Responsive to IM, Not Responsive to email. |
| 904 = K2 906 = L2 | Not responsive to Phone, Not Responsive to IM, Not Responsive to email. |

Referring to FIGS. 9A-9F, and to Table 9 and Table 10, FIG. 9A shows first region 902 having appearance J1, and second region 904/906 having appearance K1, L2. This indicates the object person being Present, face-time accessible, and Responsive to Phone, Responsive to IM, and Responsive to email. FIG. 9B shows first region 902 having appearance J1, and second 904/906 having appearance K1, L1. This indicates the object person being Present, face-time accessible, and Responsive to Phone, Responsive to IM, Not Responsive to email. FIG. 9C shows first region 902 having appearance J2, and second region 904/906 having appearance K2, L2. This indicates the object person being Not Present, and Not Responsive to Phone, Not Responsive to IM, Not Responsive to email. FIG. 9D shows first region 902 having appearance J1, and second region 904, 906 having appearance K2, L1. This indicates the object person being Not Present, face-time accessible, Not Responsive to Phone, Responsive to IM, and Not Responsive to email. FIG. 9E shows first region 902 having appearance J3, and second region 904/906 having appearance K1, L1. This indicates the object person being Present, face-time accessible, and Responsive to Phone, Responsive to IM, Not Responsive to email. FIG. 9F shows first region 902 having appearance J2, second region 904/906 having appearance K1, L2. This indicates the object person being Not Present, Responsive to Phone, Responsive to IM, Responsive to email.

FIGS. 10A and 10B show one implementation 1000 of a PR DS single indicator, providing concurrent indication of the object person's present responsiveness status and likely next state responsiveness status. The meaning of "likely" in this context includes, but is not limited to, schedule data for the object persons received at the backend server 102, as well as estimated next responsiveness states that can be determined, for example, by estimation processes applied at the backend server 102.

Referring to FIG. 10A, the implementation 1000 can include first region 1002 that can be formed, for example, as a circle or asymmetrical ellipse (not visible in FIG. 10A) and can include a second region (visible, but not separately numbered) formed by a first sub-region 1004 and second sub-region 1006. The first sub-region 1004, or the second sub-region 1006, or both, can be formed as annular rings. For purposes of description, the first sub-region 1004 and second sub-region 1006 will be collectively referenced as "second region 1004/1006. Alternatively, any one or more of the first region 1002, first sub-region 1004 or second sub-region 1006 of second region 1004/1006 can be formed with a perimeter other than a circle. The second region 1004/1006 can surround, or partially surround (not visible in FIGS. 10A-10B) the first region 1002. Referring to FIGS. 9A, 9B, and 10A together, it will be understood that features of the first region 1002 and second region 1004/1006 in accordance with mutual spatial structure can also include other example features described above in reference to first region 902 and second region 904/906.

Referring to FIG. 10B, the implementation 1000 can include a temporal presence indicator. The figure's example temporal presence indicator is structured as an overlay on, for example the first region 1002, of a current presence status field 1008 and an approaching next state presence status field 1010.

TABLE 11

| Concurrent Appearance of Sub-Regions 1008 and 1010 | PID Current and Upcoming Presence Status |
|---|---|
| 1008 - M1 | Currently Present, Available For |
| 1010 - M2 | Face Time Meeting, Upcoming Absence |
| 1008 - M2 | Currently Absent, Will Be Present |
| 1010 - M1 | Upon Upcoming Arrival, Whereupon Available For Face Time Meeting |

TABLE 12

| Second Region 1004/1006 | PID Current and Upcoming Responsiveness Status |
|---|---|
| 1004 - N1 | Currently Not Responsive, |
| 1006 - N2 | Upon Change of Presence Will be Responsive to Phone |
| 1004 - N1 | Currently Not Responsive, |
| 1006 - N4 | Will Remain Unresponsive Upon Change of Presence |
| 1004 - N1 | Currently Not Responsive, |
| 1006 - N3 | Upon Change of Presence Will be Responsive to IM |
| 1004 - N2 | Currently Responsive to Phone, |
| 1006 - N1 | Upon Change of Presence Will be Unresponsive |
| 1004 - N2 | Currently Responsive to Phone, |
| 1006 - N3 | Upon Change of Presence Will be Response to IM |
| 1004 - N2 | Currently Responsive to Phone, |
| 1006 - N4 | Upon Change Will Remain Response to Phone |
| 1004 - N3 | Currently Responsive to IM, |
| 1006 - N1 | Upon Change of Presence Will be Unresponsive |
| 1004 - N3 | Currently Responsive to IM, |

TABLE 12-continued

| Second Region 1004/1006 | PID Current and Upcoming Responsiveness Status |
|---|---|
| 1006 - N2 | Upon Change of Presence Will be Responsive to Phone |
| 1004 - N3 | Currently Responsive to IM, |
| 1006 - N4 | Upon Change of Presence, Remain Responsive to IM |

FIGS. 11A-11I show examples of temporal responsiveness indications, on example PR DS single indicators in accordance with FIGS. 10A and 10B. Referring to Table 12 above, it is seen that the four possible appearance states (N1, N2, N3, N4) of the second sub-region 1006 of the second region 1004/1006 include all three possible first sub-region 1004 appearance states (N1, N2, N3) and adds N4. The appearance state N4 indicates the object person's next state responsiveness status will be the same as the current responsiveness status, the latter being indicated by the appearance state of first sub-region 1004 of the second region 1004/1006. Without the addition of N4, the 1004, 1006 joint appearance state resulting in such instances of no change between current and next state responsiveness status would be 1004 and 1006 having the same appearance state. Regions 1004 and 1006 having the same appearance may introduce technical issues, such as an increase of time and mental effort required to scan the dashboard, and accompanying increase in user error. The technical feature of adding N4 is a solution.

FIG. 11A shows M1 fill of current presence status field 1008, M2 fill of next state presence status field 1010, N1 fill of second region first sub-region 1004, and N4 fill of second region second sub-region 1006. Referring to Table 11 and Table 12 above, the FIG. 11A state of the PR DS single indicator 1000 of current presence-responsiveness status indicates the object person is currently Present and available for face-time meeting, but has an approaching next presence state of Not Present, and that the object person is currently Not Responsive and will remain Not Responsive when in the Not Present state.

FIG. 11B shows the same M1 fill of field 1008, and M2 fill of field 1010, N1 fill of the first sub-region 1004 of second region 1004/1006, with a N2 fill of second sub-region 1006. This state of the dual state single indicator 1000 indicates the object person is currently Present and available for face-time meeting, has an approaching next presence state of Not Present, is currently Not Responsive and, after going to the Not Present state, will be Responsive to Phone.

FIG. 11C shows the FIG. 11B M1 fill of field 1008, M2 fill of field 1010, and N1 fill of second region first sub-region 1004, with an N3 fill of second region second sub-region 1006. This state of the PR DS single indicator 1000 indicates the object person is currently Present and available for face-time meeting, an approaching next state of Not Present, the object person is currently Not Responsive and, after going to the Not Present state, will be Responsive to IM.

FIG. 11D shows the same M1 fill of field 1008 and M2 fill of field 1010, with N2 fill of second region first sub-region 1004 and N4 fill of second region second region 1006. This state of the PR DS single indicator 1000 indicates the object person is currently Present and available for face-time meeting, a state of Not Present is approaching, the object person is currently Responsive to Phone and will remain responsive to Phone when Not Present.

FIG. 11E shows the FIG. 11E M1 fill of field 1008, M2 fill of field 1010, and N2 fill of second region first sub-region 1004, with an N1 fill of second region second sub-region 1006. This state of the dual state single indicator 1000 indicates the object person is currently Present and available for face-time meeting, but a state of Not Present is approaching, and the object person is currently Responsive to Phone and will be Not Responsive when Not Present.

FIG. 11F shows an M2 fill of field 1008, M1 fill of field 1010, N1 fill of second region first sub-region 1004, and N3 fill of second region second sub-region 1006. This state of the PR DS single indicator 1000 indicates the object person is currently Not Present but will be Present and available for face time meeting and is currently Not Responsive and will be Responsive to IM when Present.

FIG. 11G shows the same M2 fill of field 1008, M1 fill of field 1010, and N1 fill of second region first sub-region 1004, with N4 fill of second region second sub-region 1006, and this state of the PR DS single indicator 1000 indicates the object person is currently Not Present, but will be Present and available for face time meeting, and that the object person is currently Responsive to IM and will remain Responsive to IM phone and when Present.

FIG. 11H shows an M2 fill of field 1008 and M1 fill of field 1010, together with N3 fill of second region first sub-region 1004 and N1 fill of second region second cub-region 1006, and this state of the dual state single indicator 1000 indicates the object person is currently Not Present, will be Present and available for face time meeting, and that the object person is currently Responsive to IM and will be Not Responsive when Present.

FIG. 11I shows the FIG. 11H M2 fill of field 1008, M1 fill of field 1010, and N3 fill of second region first sub-region 1004, with an N2 fill of second region second sub-region 1006 and this state of the dual state single indicator 1000 indicates the object person is currently Not Present, will be Present and available for face time meeting is approaching, and that the object person is currently Responsive to IM and will be Response to Phone when Present.

FIGS. 12A-12D illustrate dual state single indicators of presence-responsiveness status, such as described above in reference to FIGS. 10A-10B, and 11A-11I, in further combination with features indicating specific temporal attributes of the object person's presence-responsiveness status. FIG. 12A shows one general example includes a temporal status change indicator "XPT," inserted or superposed in the FIG. 12A example, on the current presence status field 1008. In operation, as will be described in reference to FIGS. 12B, 12C, and 12D, a specific time can display at the XPT location. The specific time can indicate when the current presence status will change as indicated by the respective appearance states of the current presence status field 1008 and next presence status field 1010, together with the current responsiveness status changing or remaining unchanged, as indicated by the respective appearance states of the first sub-region 1004 and second sub-region 1006 of the second region 1004/1006. The time can be configured, for example, as "Hour, Minute, AM/PM" or in 24-hour time format.

FIG. 12A shows XPT superposed on the above-described FIG. 11A, which, as described, indicates the object person is currently present and available for face-time meeting, there is an approaching next state of Not Present, and that the object person is currently Not Responsive and, after going to the Not Present state, will be responsive to IM. The specific displayed time XPT is when the object persons will go to the Not Present state, and the Responsive to IM state.

FIG. 12B shows a specific XPT of "4:00 PM" superposed on the above-described FIG. 11D. Referring to FIG. 12B and FIG. 11D, and Tables 11 and 12, it will be understood that FIG. 12B indicates the object person is currently present and available for face-time meeting, will become Not Present at 4:00 PM, is currently Responsive to Phone and, when Not Present, will remain responsive to Phone.

FIG. 12C shows a specific XPT of "8:00 AM" superposed on the above-described FIG. 11D. Referring to FIG. 12B and FIG. 11D, together with Tables 11 and 12, it will be understood that FIG. 12C indicates the object person is currently Not Present, will become Present at 8:00 AM, is currently Responsive to IM and, when Present, will remain Responsive to IM.

FIG. 12D shows the same XPT of "8:00 AM" superposed on the above-described FIG. 11I. Referring to FIG. 12B and FIG. 11I, together with Tables 11 and 12, it will be understood that FIG. 12D indicates the object person is currently Not Present, at 8:00 AM will be Present and available for face time meeting is approaching, and that the object person is currently Responsive to IM and will be Responsive to Phone when Present.

Description above and corresponding visible examples in FIGS. 10A-12D, show implementations with overlay indication of temporal attributes being arranged over an inner region e.g., fields 1008 and 1010 overlaying first region 1002. It will be understood that such implementations are only for purposes of example and are not intended as any limitation on practices according to this disclosure. For example, contemplated implementations can include overlay and other switchable appearance aspects of the first sub-region 1004, or second sub-region 1006, or both, of the second region 1004/1006.

Above-described implementations of presence-responsiveness status dual state single indicators and examples thereof show a first region as a circular perimeter inner region, surrounded by one or more annular regions. It will be understood that the circular perimeter inner region is only one example, and that alternative implementations can form the first region with any shape. For example, and without limitation, the first region can be a noncircular ellipse, or can be a polygon, e.g., triangle, rectangle, pentagon, hexagon, septagon, or octagon, or can be a trapezoid, or any other asymmetrical polygon. The perimeter can also have an irregular form.

It will likewise be understood that any of the described annular regions can be replaced with a non-annular form. For example, any of the described annular regions can be replaced by a rectangular, triangular, other polygonal, or irregular frame-like region. Also, the circular-annular configuration is only one example configuration and is not intended as a limitation. Various examples of such alternatives are described in greater detail in later sections of this disclosure.

Also, the above-described examples illustrate the first region being interior to or surrounded by the indicator second region. It will be understood that this is only one example configuration and is not intended as a limitation. Alternatives can include, without limitation, an indicator first region being an exterior area of the indicator, and the indicator second region being an interior area, surrounded by the first region.

FIG. 13 illustrates an example triangle-circle configuration of one implementation of a polygon-ellipse dual state single-indicator 1300 (hereinafter "dual state single indicator 1300"), for tracking and visible presentation of object persons' current presence-responsiveness status. The dual state indicator 1300 can include a triangular shaped first region 1302 surrounded by a second region 1304 that can extend from a perimeter (visible in FIG. 13 but not separately numbered) of the triangular first region 1302 to an ellipse-shaped outer perimeter 1304A (visible in FIG. 13 but not separately numbered). Features of the first region 1302 and second region 1304 in accordance with mutual spatial structure can include, for example, the geometric center of the first region 1302, labelled "GC4," being within an encompassing perimeter, e.g., the reference perimeter line labeled "EP8" of the second region 1304. Another feature is the geometric centroid (not separately marked) of the triangular first region 1302 being within the encompassing perimeter EP8 of the second region 1304. Moreover, encompassing perimeter EP9 of the triangular first region 1302 is within the encompassing perimeter EP8 of 1304.

Referring to FIGS. 2 and 13, an example alternative to dashboard 206 can be implemented by substituting a dual state single indicator 1300 for each dual state single indicator 208, and its operation can include setting the appearance (e.g., color or pattern, or both) of triangular first region 1302 in accordance with the Table 1 assignments for first region 216 and setting the appearance of the region 1304 in accordance with the Table 2 assignments for second region 218.

FIG. 14 illustrates an example rectangle-circle configuration of another implementation of a polygon-ellipse dual state single-indicator 1400 (hereinafter "dual state single indicator 1400"), for tracking and visible presentation of object persons' current presence-responsiveness status. The dual state indicator 1400 can include rectangular first region 1402 surrounded by a second region 1404 that can extend from a perimeter (visible in FIG. 14 but not separately numbered) of the rectangular first region 1402 to a rectangular shaped outer perimeter 1404A. Referring to FIGS. 13 and 14, it can be seen that an encompassing perimeter (not separately marked on FIG. 14) of first region 1402 relative to an encompassing perimeter (not separately marked on FIG. 14) of second region 1404 can be comparable to the above described encompassing perimeter EP9 relative to EP8. Accordingly, features of the FIG. 14 first region 1402 and second region 1404 in accordance with mutual spatial structure can include example features described above in reference to first region 1302 and second region 1304.

Referring to FIG. 2 and FIG. 14, another alternative to dashboard 206 can be implemented by substituting a dual state single indicator 1400 for each dual state single indicator 208 and setting the appearance of rectangular first region 1402 in accordance with Table 1 assignments for first region 216 and the appearance of region 1404 in accordance with Table 2 assignments for second region 218.

FIG. 15 illustrates an example square-square configuration of an implementation of a polygon-polygon dual state single-indicator 1500 (hereinafter "dual state single indicator 1500"), for tracking and visible presentation of object persons' current presence-responsiveness status. The dual state indicator 1500 can include a rectangular first region 1502 surrounded by a second region 1504 that can extend from a perimeter (visible in FIG. 15 but not separately numbered) of the rectangular first region 1502 to a rectangular shaped outer perimeter (visible in FIG. 15 but not separately numbered). Features of the first region 1502 and second region 1504 in accordance with mutual spatial structure can include, for example, the geometric center of the first region 1502, e.g., the example reference point labelled "GC5," being within an encompassing perimeter "EP10" of the second region 1504, as well as the geometric centroid (not separately marked) of the rectangular first region 1502 being within EP10. Another feature is perimeter EP11 of the first region 1502 being within the encompassing perimeter EP10 of 1504.

Referring to FIG. 2, another example alternative to dashboard 206 can be implemented by substituting a dual state single indicator 1500 for each dual state single indicator 208 and setting the appearance of rectangular first region 1502 in accordance with Table 1 assignments for first region 216 and the appearance of region 1504 in accordance with the Table 2 assignments for second region 218.

FIG. 16 illustrates an example circle-hexagon configuration of one implementation of a polygon-ellipse dual state single-indicator 1600 (hereinafter "dual state single indicator 1600"), for tracking and visible presentation of object persons' current presence-responsiveness status. The dual state indicator 1600 can include a circular first region 1602 surrounded by a second region 1604 extending from a perimeter (visible in FIG. 16 but not separately numbered) of the region 1602 to a hexagonal shaped outer perimeter (visible in FIG. 16 but not separately numbered). Another alternative to the FIG. 2 dashboard 206 can be implemented by substituting a dual state single indicator 1600 for each dual state single indicator 208 and setting the appearance of circular first region 1602 in accordance with Table 1 assignments for first region 216 and the appearance of region 1604 in accordance with the Table 2 assignments for second region 218.

FIG. 17 illustrates an example circle with hexagon-circle configuration of one implementation of an ellipse with polygon-ellipse dual state single-indicator (hereinafter "dual state single indicator 1700"), for tracking, distribution, and visible presentation of object persons' current presence-responsiveness status. The dual state indicator 1700 can include a circular first region 1702 surrounded by a second region (visible, but not separately numbered) that can be formed by a first sub-region 1704 and a surrounding second sub-region 1706. For purposes of description, the first sub-region 1704 and second sub-region 1706 will be collectively referenced as "second region 1704/1706." The first sub-region 1704 can extend from a circular perimeter (visible, but not separately numbered) of the first region 1702 to a hexagonal shaped inner perimeter (visible, but not separately numbered) the second sub-region 1706. Features of the first region 1702 and second region 1704/1706 in accordance with mutual spatial structure can include, for example, the geometric center of the first region 1702, e.g., the example reference point labelled "GC6," being within an encompassing perimeter "EP12" of the second region 1704/1706, as well as the geometric centroid (not separately marked) of the first region 1702 being within EP12. Another feature is perimeter EP13 of the first region 1702 being within the encompassing perimeter EP12 of the second region 1704/1706.

Referring to FIGS. 7, 9A-9F, and 17, an alternative to dashboard 702 can be implemented by substituting a dual state single indicator 1700 for each dual state single indicator 706 and setting the appearance of circular first region 1702 in accordance with Table 9 assignments for first region 902, and the appearance of first sub-region 1704 and second sub-region 1706 in accordance with the respective Table 10 assignments for the first and second sub-regions 904 and 906 of the second region 904/906.

FIG. 18A illustrates another example rectangle-rectangle implementation 1800A of a polygon-polygon dual state single-indicator for tracking, distribution, and visible presentation of object persons' current presence-responsiveness status in accordance with the present disclosure. FIG. 18A shows superposed reference lines and markings, including a geometric centroid GC7 of the first region 1802, an encompassing perimeter "EP14" of the second region 1804, and an encompassing perimeter EP15 of the first region 1802. Features of the first region 1802 and second region 1804 in accordance with mutual spatial structure include, but are not limited to, GC7 being within the second region 1804 encompassing perimeter EP14, and the encompassing perimeter EP15 of the first region 1802 being within the second region 1804 encompassing perimeter EP14.

FIG. 18B illustrates a variation 1800B, which includes a segmented form of the second region 1804. The segmented form visible in FIG. 18B includes four segments or portions, all numbered 1804, and all being aligned along the path of the original FIG. 18A non-segmented second region 1804. The centroid of the four-segment second region can be a weighted average of the respective centroids "CT" of the four regions. The weighting can be, for example, according to relative area. In the FIG. 18B example, the relative areas of the four segments 1804 are identical, and, therefore the weights are uniform. The average centroid, "ACT," can therefore be equidistant from the four centroids CT. As visible in FIG. 18B, the first region 1802 and the four segment second region 1804 therefore maintain the mutual spatial structure from FIG. 18A.

FIG. 18C illustrates a further segmented variation 1800C, carrying two of the four lateral segments 1804 (e.g., the pair of segments 1804 spaced apart horizontally by the first region 1802). Since the FIG. 18C pair of second region segments have the same area, average centroid, "ACT," is the same as ACT of FIG. 18B. The mutual spatial structure from FIG. 18A is therefore maintained.

FIGS. 18D and 18E illustrate first region 1802 and second region 1804 appearances, 1880D and 1800E, using the legend at the top of the figure, which is defined according to the following Tables 13 and 14. The example content of Table 13 replicates Table 1, defining the rectangular first region 1802 instead of the FIG. 2 circular first region 216. The example content of Table 14 replicates Table 2, modified to define the segmented second region 1804 as opposed to the FIG. 2 second region 216

TABLE 13

| First Region 1802 Appearance | PID Presence Status |
|---|---|
| A1 | Present, face-time accessible. |
| A2 | Not Present |
| A3 | Present, not face-time accessible. |

An example set of three appearances from which the appearance state of second section 218 can be selected can include a second region first appearance B1, a second region second appearance B2, and a second region third appearance B3.

Table 2 below shows, for each of the B1, B2, and B3, second region 218 appearance states, an example corresponding meaning in terms of the tracked object person's responsiveness status.

TABLE 14

| Segmented Second Region 1804 Appearance | PID Responsiveness Status |
|---|---|
| B1 | Not Responsive |
| B2 | Responsive Only to Phone |
| B3 | Responsive Only to IM |

Referring to FIG. 18D, Table 13, and Table 14, the appearance 1800D is A3, B2, which indicates a presence status of Present, face-time accessible, and responsiveness status of Responsive Only to Phone. Referring to FIG. 18E, Tables 13 and 14, the appearance 1800E is A1, B3, which indicates a presence status of Present, face-time accessible, and responsiveness status of Responsive Only to IM.

Technical features illustrated by FIGS. 18D and 18E include, for example, indication of multiple, different presence and responsiveness statuses using a single fixed-width image, in contrast to techniques that display such status as a string of icons. Technical advantages of the present technique include, but are not limited to, removal of a requirement of dedicated display area for the full string of icons, as well as lower user effort and lower user error rate when visually checking object person responsiveness statuses.

Figure 19A:
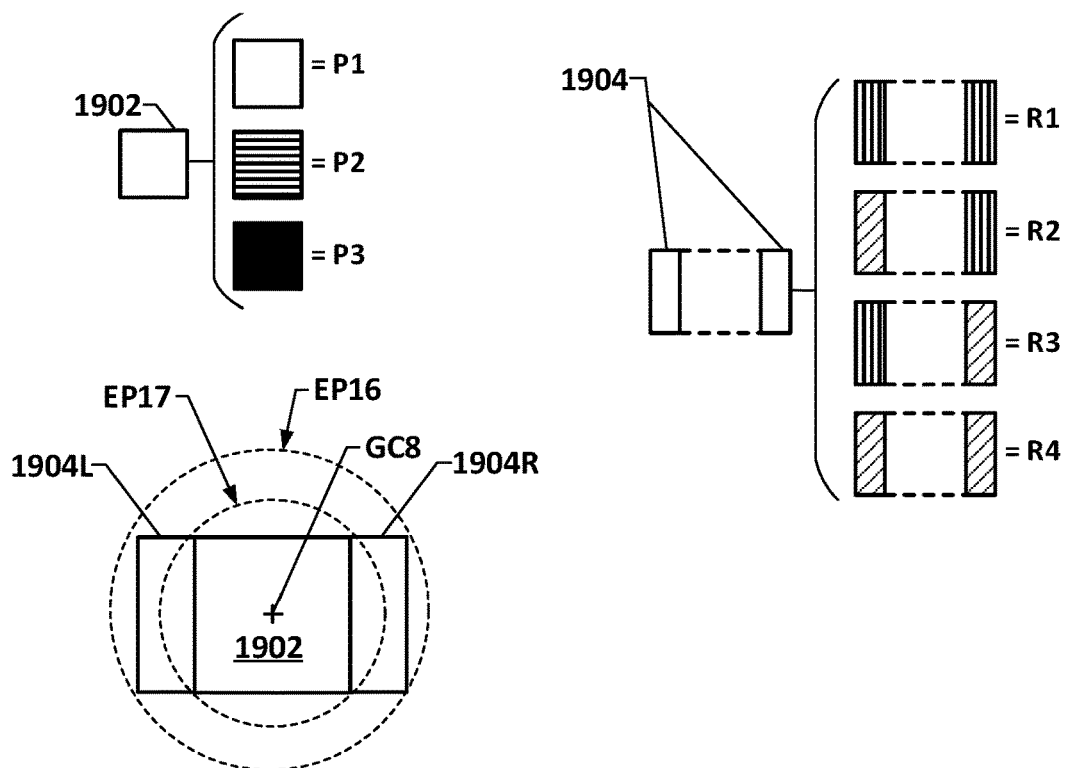
FIG. 19A shows example graphical reference markings superposed on another dual state single-indicator, illustrating various features of mutual spatial structure of a first region and another segmented second region, in accordance with the present disclosure.

FIGS. 18A-18E show the two segments of the second region 1804 being displayed with the same appearance, which is only for purposes of example. For example, one finer granularity indication of responsiveness status can be provided by assigning different segments of the second region as sub-regions, then defining the second region appearances as different combinations of the sub-region appearances. FIG. 19A shows one example, which can include a first region 1902, surrounded by a second region (not separately numbered) formed, for example, by a combination of a left side sub-region 1904L and a right side region 1904R. For purposes of description, the visible second region can be referred to as "second region 1904." FIG. 19A shows example graphical reference markings superposed, including a geometric centroid GC8 of the first region 1902, an encompassing perimeter "EP16" of the second region 1904, and an encompassing perimeter EP17 of the first region 1902. Features of the first region 1902 and second region 1904 in accordance with mutual spatial structure include, but are not limited to, GC8 being within the second region 1904 encompassing perimeter EP16, and the encompassing perimeter EP17 of the first region 1902 being within the second region 1904 encompassing perimeter EP16.

FIGS. 19B-19E illustrate first region 1902 and second region 1904 appearances 1900B, 1900C, 1900D, and 1900E, using the legend at the top of the figure, which is defined according to the following Tables 15 and 16. The example content of Table 15 replicates Table 9, defining the rectangular first region 1902, instead of the FIGS. 9A-9F circular first region 1902.

TABLE 15

| First Region 1902 Appearance | PID Presence Status |
| --- | --- |
| P1 | Present, face-time accessible. |
| P2 | Not Present |
| P3 | Present, Not face-time accessible. |

Table 16 is shown as a modification of Table 10, defining the segmented second region 1904 in terms of four combinations of 1904L and 1904R, referred to as R1, R2, R3, and R4, as opposed to the FIG. 9 second region 904/906.

TABLE 16

| Second Region 1904 Appearance | PID Responsiveness Status |
| --- | --- |
| R1 | Responsive to Phone, Responsive to IM, Not Responsive to email. |
| R2 | Responsive to Phone, Responsive to IM, Responsive to email. |

TABLE 16-continued

| Second Region 1904 Appearance | PID Responsiveness Status |
| --- | --- |
| R3 | Not Responsive to Phone, Responsive to IM, Not Responsive to email. |
| R4 | Not responsive to Phone, Not Responsive to IM, Not Responsive to email. |

Figure 19B:
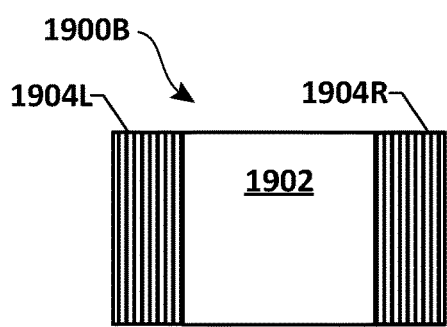
FIGS. 19B-19E illustrate four respective first region and second region appearances in visible indication of presence-responsiveness statuses provided by the FIG. 19A dual state single-indicator in accordance with the present disclosure.
Figure 19C:
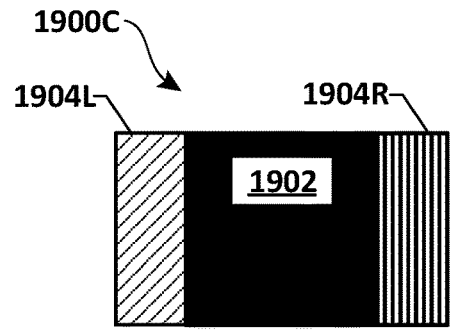
Figure 19D:
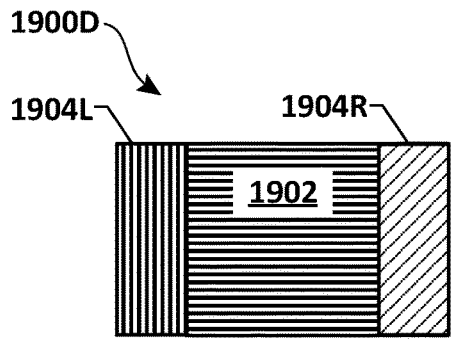
Figure 19E:
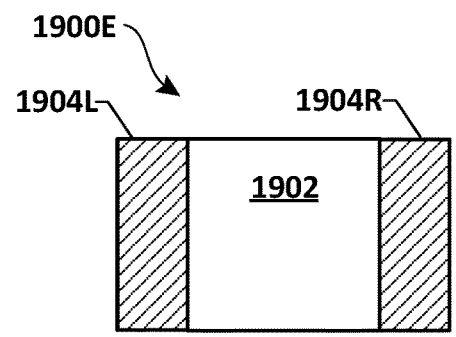

Referring to FIG. 19B, Table 15, and Table 16, the appearance 1900B is P1, R1, which indicates a presence status of Present, face-time accessible, and responsiveness status of Responsive to Phone, Responsive to IM, Not Responsive to email. Referring to FIG. 19C, Table 15, and Table 16, the appearance 1900C is P3, R2, which indicates a presence status of Present, Not face-time accessible, and responsiveness status of Responsive to Phone, Responsive to IM, and Responsive to email. Referring to FIG. 19D, Tables 15 and 16, appearance 1900D is P2, R3, which indicates a presence status of Not Present, and responsiveness status of Not Responsive to Phone, Responsive to IM, Not Responsive to email. Referring to FIG. 19E, Tables 15 and 16, the appearance 1900E is P1, R4, which indicates a presence status of Present, face-time accessible, and responsiveness status of Not Responsive to Phone, Not Responsive to IM, and Not Responsive to email.

FIGS. 20A-20L illustrate eight respective first region 2002 and second region 2004 appearances, in an example of another implementation of a mutual spatial structure dual state single indicators of current presence-responsiveness, in accordance with the present disclosure. FIGS. 20A-20L illustrate first region 2002 and second region 2002 appearances 2000A through 2000L, using the legend at the top of the figure, which is defined according to the following Tables 17 and 18.

TABLE 17

| First Region 2002 Appearance | PID Presence Status |
| --- | --- |
| S1 | Present, face-time accessible. |
| S2 | Not Present |
| S3 | Present, not face-time accessible. |

An example set of three appearances from which the appearance state of second section 218 can be selected can include a second region first appearance B1, a second region second appearance B2, and a second region third appearance B3.

Table 2 below shows, for each of the B1, B2, and B3, second region 218 appearance states, an example corresponding meaning in terms of the tracked object person's responsiveness status.

TABLE 18

| Segmented Second Region 2004 Appearance | PID Responsiveness Status |
| --- | --- |
| T1 | Not Responsive |
| T2 | Responsive Only to Phone |
| T3 | Responsive Only to IM |
| T4 | Responsive to Phone, IM, and email |

Referring to FIG. 20A, Table 17 and Table 18, appearance 2000A is S1, T1, which indicates a presence status of Present, face-time accessible, and responsiveness status of Not Responsive. Continuing to refer to Tables 17 and 18, FIG. 20B appearance 2000B is S1, T2, indicating presence status of Present, face-time accessible, and responsiveness status of Responsive Only to Phone; FIG. 20C appearance 2000C is S1, T3, indicating presence status of Present, face-time accessible, and responsiveness status of Responsive Only to IM; and FIG. 20D appearance 2000D is S1, T4 indicating presence status of Present, face-time accessible, and responsiveness status of Responsive to Phone, IM and email. FIG. 20E appearance 2000E is S2, T1, indicating presence status of Not Present, and responsiveness status of Not Responsive; FIG. 20F appearance 2000E is S2, T2, indicating presence status of Not Present, and responsiveness status of Responsive Only to Phone; FIG. 20G appearance 2000G is S2, T3, indicating presence status of Not Present, and responsiveness status of Responsive Only to IM; and FIG. 20H appearance 2000H is S2, T4, indicating presence status of Not Present, and responsiveness status of Responsive to Phone, IM and email. Continuing to refer to Tables 17 and 18, FIG. 20I appearance 2000I is S3, T1, indicating presence status of Present, not face-time accessible, and responsiveness status of Not Responsive; FIG. 20J appearance 2000J is S3, T2, indicating presence status of Present, not face time accessible, and responsiveness status of Responsive Only to Phone; FIG. 20K appearance 2000G is S3, T3, indicating presence status of Present, not face time accessible, and responsiveness status of Responsive Only to IM; and FIG. 20L appearance 2000L is S3, T4, indicating presence status of Present, not face time accessible, and responsiveness status of Responsive to Phone, IM and email.

Technical features illustrated by FIGS. 20A-20L include, for example, indication of multiple, different presence and responsiveness statuses using a single fixed-width image, as opposed to techniques that display such status as a string of icons. Technical advantages of the present technique include, but are not limited to, removal of a requirement of dedicated display area for the full string of icons, as well as lower user effort and lower user error rate when visually checking object person responsiveness statuses.

Figure 21:
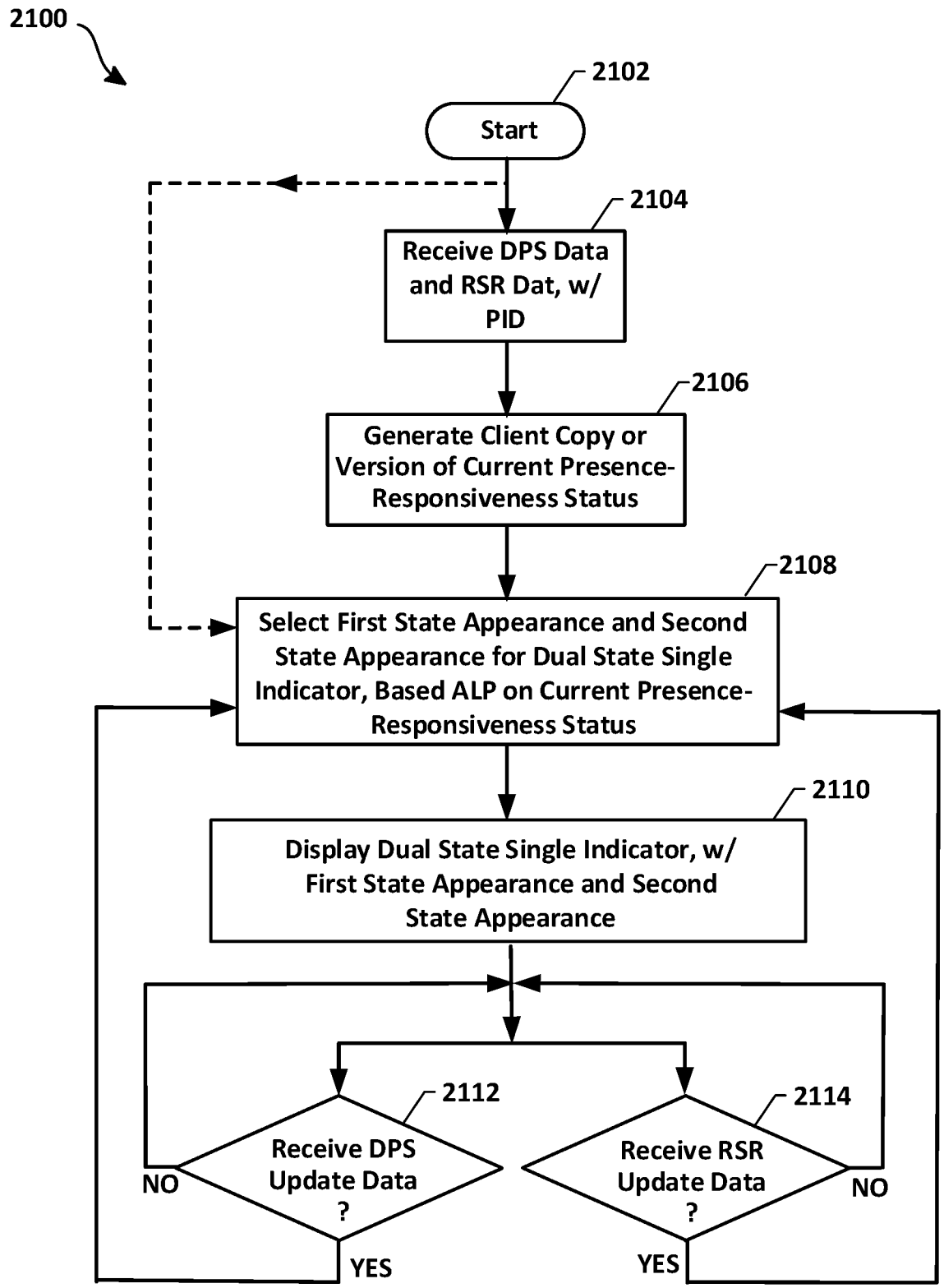
FIG. 21 shows a functional block diagram of an example flow in a process of a client-side updating a client dashboard of dual state single-indicators of object persons' current presence and responsiveness status, in processes of presence-responsiveness status tracking, distribution, and visible presentation in accordance with the present disclosure.

FIG. 21 shows a functional block diagram 2100 of an example operational flow (hereinafter "flow 2100") in a process of client-side construction of a client dashboard of dual state single-indicators of object persons' presence status and responsiveness status. Instances of operations such as shown in FIG. 21 can be applied in presence-responsiveness status tracking, distribution, and visible presentation in accordance with the present disclosure. Operations in the flow 2100 can be performed, for example, by any of the FIG. 1 system 100 clients 106, or by the client 108, or both. It will be understood that different clients may present presence-responsiveness status, and perform updates thereof, for different object persons. Therefore, different clients can perform respective instances of updates, in accordance with the flow 2100, in an asynchronous manner.

It will be understood that the ordering of FIG. 21 blocks and allocations of functions to blocks is for purposes of describing, in a linear manner, relevant inputs received, logic functions performed in response, and outputs from such functions. The FIG. 21 ordering of blocks and allocations of functions to blocks is not intended to limit client processing resources to performing operations in the same ordering as the blocks, or in groupings corresponding to the allocation of functions to blocks.

Operations according to the flow 2100 can proceed from an arbitrary start 2102 to 2104, for example, in response to an initialization of a client-side presence-responsiveness status of a particular object person. Operations at 2104 can include receiving data indicative of an object person's current presence status, and indicative of the object person's current responsiveness status. Data received at 2104 indicative of an object person's current presence status will be generically referenced in this description as "DPS data," and is visible as such in FIG. 21. Data received at 2104 indicative of an object person's current presence status will be generically referenced in this description as "RSR data," which appears in FIG. 21. Data received at 2104 can include information (visible in FIG. 21 as "PID") indicative of an identity of the object person associated with the DPS and RSR data. It will be understood that, as applied herein, "DPS data" is a coined representation of the word string "data indicative of an object person's current presence," and carries no intrinsic meaning. It will be understood that "RSR data" is a coined representation, for this description, of the word string "data indicative of an object person's current responsiveness," and carries no intrinsic meaning.

Regarding DPS data and RSR data received at 2104, such data can be received as direct DPS or RSR updates, or instructions, from the backend server 102. Such updates may be generated, for example, by software modules (not visible in FIG. 21) on the backend server 102. Such modules may, for example, receive various DPS and RSR data, and such data may be varying reliability, then input such data to classification or estimation processes (not visible in FIG. 21) hosted by server 102 and, based on the process results, transmit DPS and RSR updates to the client. Operations in receiving updates at 2104 can include the client sending to the backend server 102 requests for DPS updating, or RSR updating, or both updating. In other words, the client may be configured to pull such updates from 102. Alternatively, or additionally, operations at 2104 can include receiving DPS or RSR updates, or both, that are pushed by the backend server 102. Operations at 2104 can include receiving DPS data or RSR data, or both, based on explicit DPS data (not visible in FIG. 21), or explicit RSR data not visible in FIG. 21), or both, input by the object person. For example, there can be provision for an object person to input notices (e.g., through a graphical user interface). Examples can include, without limitation, "I am out," "I am present," or "I am present but, for the time being, cannot receive direct visitation" or " . . . am not available for direct face time." In addition to, for example as a back-up to at least some DPS updating and/or RSR updating performed at the backend server 102, a peer-to-peer communications option can be provided. For example, referring to the above example explicit notice of "I am present," a peer-to-peer communication of the notice may be performed, for example, in any instances of lost connection to the backend server 102.

A process according to the flow 2100 can proceed from 2104 to 2106 and apply operations of generating a client-side version or copy of the object person's current presence-responsiveness status. The version can be, for example, an object person's initial current presence-responsiveness status. The presence-responsiveness status at 2106 can include a content such as statuses described above in reference to Tables 1-12. From 2106, the flow 2100 can proceed to 2108 and apply operations of generating or selecting a dual state indicator appearance that visibly presents the object person's current presence-responsiveness status. An output of the generation or selection can be a pair appearance identifiers, such as appear in the respective left columns of Tables 1-12.

Applying the above-described operations from 2106 to 2108 to the FIG. 2 DS single indicators 210 and example Tables 1-12, a high level logic flow of such operations can be: based on presence-responsiveness status generated at 2106, identify two tables among Tables 1-12 such that one of the two has an entry for the current presence status and the other has an entry for the current responsiveness status. The two entries are respectively a first state appearance identifier and a second state appearance identifier. Then perform a selection, for example, among the appearance to presence-responsiveness legends presented in the figures, for a legend that includes the first state appearance identifier and second state appearance identifier found in two tables. Then proceed to generate or retrieve a video data that will cause display of DA single indicator, e.g., one of the PR DS single indicators 210 in dashboard 206, with an appearance such as that found by referring to the legends.

One specific example according to the above described high level logic flow can be as follows: assume 2106 generates a presence-responsiveness status of "Present, Not Available for Face Time" and "Responsive Only to IM." Referring to Tables 1-12, Tables 1 and 2 are an example two tables having, in combination, entries for "Present, Not Available for Face Time" and "Responsive Only to IM." The entries show A3-B3. Referring to the legend at the top of FIG. 2, a PR DDS single indicator combination having a first state appearance identifier and second state appearance identifier is the PR DS single indicator 210 visible in the FIG. 2 block 208-R.

Operations in a process according to the flow 2100 can proceed from 2110 to 2112, where operations can be applied to display, for example, on UI 202 a PR DS single indicator with the appearance selected at 2108. Operations can proceed from 2112 to a logic wait or loop state such as the example represented by branch logic 2114 and branch logic 2116. As visible in FIG. 21, exit conditions from the logic wait or loop state can be, for example, receipt of DPS update data at 2116 or receipt of RSR update data at 2118. Upon the exit condition, operations can return to and repeat 2110 using the updated DPS or RSR data, or both, then proceed to 2112 and then to 2114/2116.

Referring to FIG. 21, a dotted path is shown extending from the start 2102 to 2110. The flow 2100 can proceed on that path, for example, in response to direct DPS or RSR updates from the server 102, as such updates can bypass 2104.

Figure 22:
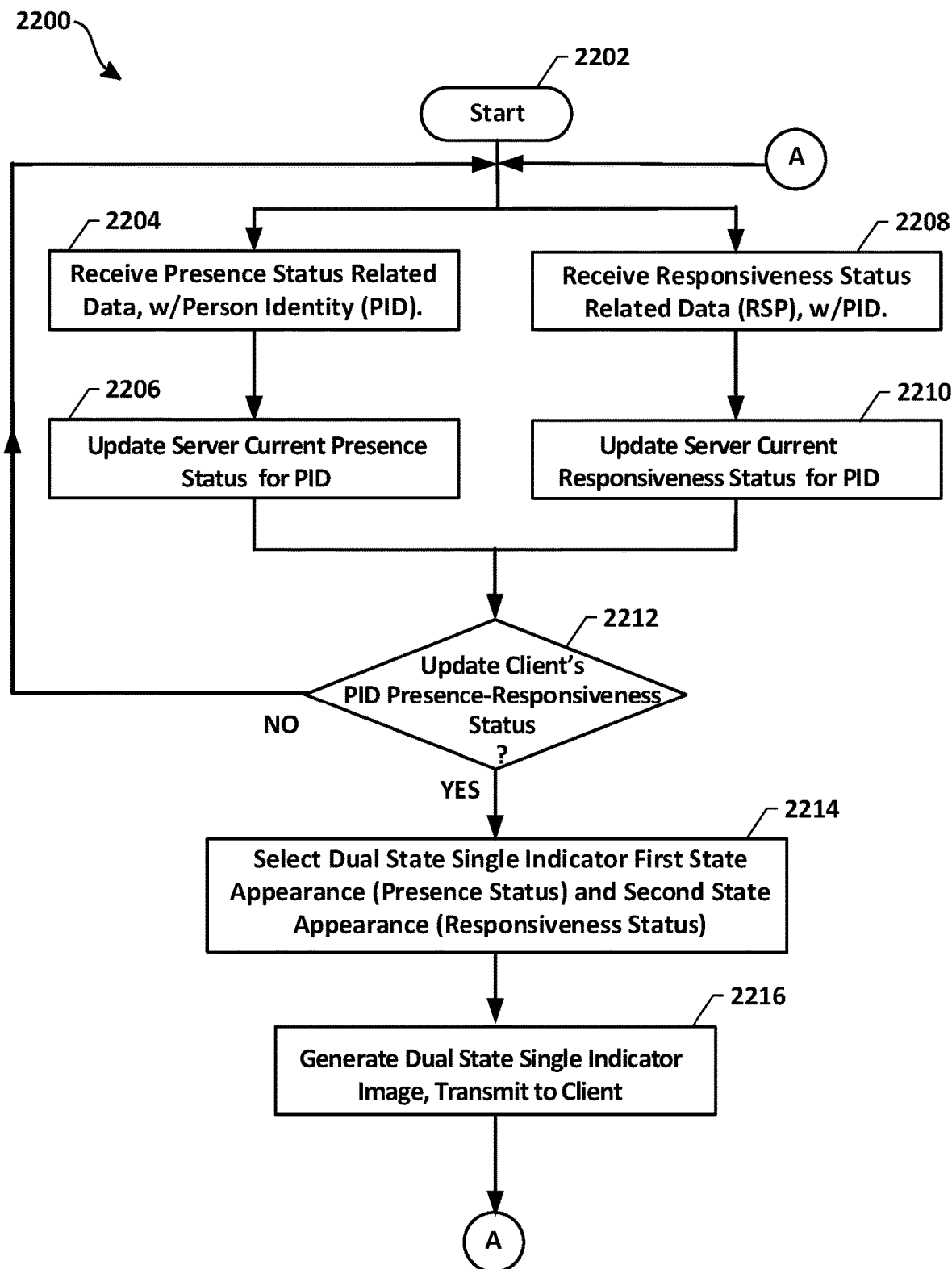
FIG. 22 shows a functional block diagram of an example flow in a process of a server-side tracking and updating of object persons' presence-responsiveness status, in systems processes of presence-responsiveness status tracking and distribution in accordance with the present disclosure.

FIG. 22 shows a functional block diagram 2200 of an example flow of operations in a process of a server-side tracking and updating of object persons' presence-responsiveness status, in systems of presence-responsiveness status tracking and distribution in accordance with the present disclosure. Operations will be described assuming the back-end server 102 stores, in association with a given object person, a previously generated server current presence status, and a previously generated server current responsiveness status, and stores a previously generated client current presence status and previously generated client current responsiveness status. This can enable the server to store, in association with a given object person, a current presence status and current responsiveness status that may include information not normally sent to the clients. It can also enable the server 102 to configure, in association with a given person who is an object person to multiple clients, a plurality of client-specific versions of the person's current presence-responsiveness status.

Operations according to the flow 2200, upon receiving presence status related data, can proceed from an arbitrary start 2202 to 2204, apply operations associated with such reception, and then proceed to 2206 where operations can be applied to update the server current presence status. The start 2202 can function as a start for the above-described proceeding to 2204 and, upon receiving responsiveness status related data, can be a logic start for proceeding to 2208 to apply operations in such reception, and from 2208 can proceed to 2210 and apply operations to update the server current responsiveness status. As described above, the server current presence status and server current responsiveness status can differ from the client versions of such statuses. Associated with differences, implementations can apply conditions or rules to determine if either or both of the updates at 2206 and 2210 necessitate an update of the client version of the current presence status or current responsiveness status. FIG. 22 block branch logic 2212 can be an example of such conditions or rules. If the conditions or rules do not qualify the updates at 2206 and 2210 as necessitating update of the client versions, the flow 2200 can return to a wait state, which is visible in FIG. 22 as a position between the start 2202 and blocks 2204 and 2208.

Upon conditions or rules applied at logic branch 2212 qualifying the update at 2206 or at 2210 to update the client's presence-responsiveness status for the object person, the update can be applied and the flow 2200 can proceed to 2214. At 2214, operations can be applied to select a dual state single indicator first state appearance corresponding to the updated client version of the current presence status and select a dual state single indicator second state appearance corresponding to the updated client version of the current responsiveness status. Operations at 2214 can be comparable, in logic, to applying the above-described Tables 1-12 and respective legends at the upper portion of one or more of FIGS. 2-15.

In an implementation, upon applying operations at 2214, the flow 2200 can proceed to 2216, where operations can be applied to generate a dual state single indicator image in accordance with the first state appearance and second state appearance selected at 2214. For example, such appearance can implement or be modifications of any of the examples on FIGS. 3A-3I, FIG. 4, FIG. 5, FIGS. 6A-6I, FIG. 7, or FIGS. 8A-8I. Also, operations at or associated with 2216 can include generating the dual state single indicator image to include any of the current state—next state features described above in reference to one or more among FIGS. 10AA through 12D. From 2216 the flow 2200 can return to the start 2202.

Figure 23:
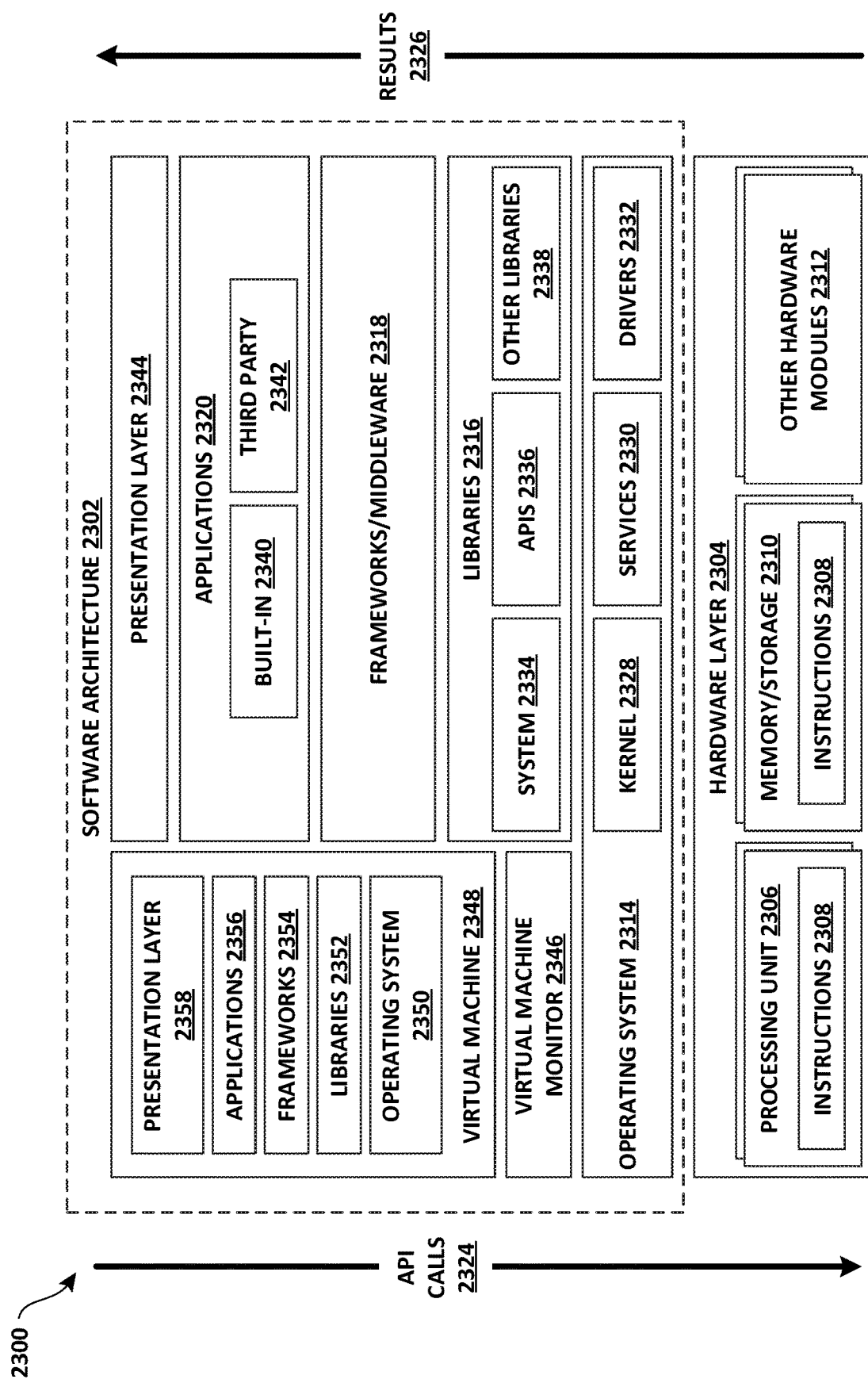
FIG. 23 shows a block diagram illustrating one example software architecture, various portions of which may be used in conjunction with various hardware architectures herein described.

FIG. 23 is a block diagram 2300 illustrating an example software architecture 2302, various portions of which may be used in conjunction with various hardware architectures herein described, which may implement any of the above-described features. FIG. 23 is a non-limiting example of a software architecture and it will be appreciated that many other architectures may be implemented to facilitate the functionality described herein. The software architecture 2302 may execute on hardware such as client devices, native application provider, web servers, server clusters, external services, and other servers.

A representative hardware layer 2304 includes a processing unit 2306 and associated executable instructions 2308. The executable instructions 2308 represent executable instructions of the software architecture 2302, including implementation of the methods, modules and so forth described herein. The hardware layer 2304 includes a memory/storage 2310 that can include the executable instructions 2308 and accompanying data. The hardware layer 2304 may also include other hardware modules 2312. Instructions 2308 held by processing unit 2308 may be portions of instructions 2308 held by the memory/storage 2310.

The example software architecture 2302 may be conceptualized as layers, each providing various functionality. For example, the software architecture 2302 may include operating system (OS) 2314, libraries 2316, frameworks 2318, applications 2320, and a presentation layer 2324. Operationally, the applications 2320 and/or other components within the layers may invoke API calls 2324 to other layers and receive corresponding results 2326. The layers illustrated are representative, and other software architectures may include additional or different layers. For example, some mobile or special purpose operating systems may not provide the frameworks/middleware 2318.

The OS 2314 may manage hardware resources and provide common services. The OS 2314 may include, for example, a kernel 2328, services 2330, and drivers 2332. The kernel 2328 may act as an abstraction layer between the hardware layer 2304 and other software layers. For example, the kernel 2328 may provide memory management, processor management (for example, scheduling), component management, networking, security settings, and so on. The services 2330 may provide other common services for the other software layers. The drivers 2332 may perform control or interface with the underlying hardware layer 2304. For instance, the drivers 2332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 2316 may provide a common infrastructure that may be used by the applications 2320 and/or other components and/or layers. The libraries 2316 can provide functionality for use by other software modules to perform tasks, rather than interacting directly with the OS 2314. The libraries 2316 may include system libraries 2334 (for example, C standard library) that may provide functions such as memory allocation, string manipulation, and file operations. The libraries 2316 may include API libraries 2336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 2316 may include other libraries 2338 to provide functions for applications 2320 and other software modules.

The frameworks 2318 (also sometimes referred to as middleware) can provide a higher-level common infrastructure that may be used by the applications 2320 and/or other software modules. For example, the frameworks 2318 may provide graphic user interface (GUI) functions, high-level resource management, or high-level location services. The frameworks 2318 may provide a spectrum of other APIs for applications 2320 and/or other software modules.

The applications 2320 can include built-in applications 2320 and/or third-party applications 2322. Examples of built-in applications 2320 may include, but are not limited to, a contacts application, a browser application, a location application, a media application, a messaging application, and/or a game application. Third-party applications 2322 may include any applications developed by an entity other than the vendor of the particular system. The applications 2320 may use functions available via OS 2314, libraries 2316, frameworks 2318, and presentation layer 2324 to create user interfaces to interact with users.

The software architecture 2302 can include a virtual machine 2328. The virtual machine 2328 can provide, for example, an execution environment for applications/modules to execute as if executing on a hardware machine (such as the machine 2300 of FIG. 23, for example). The virtual machine 2328 may be hosted by a host OS (for example, OS 2314) or hypervisor, and may have a virtual machine monitor 2326 which can manage operation of the virtual machine 2328 and interoperation with the host operating system. A software architecture, which may be different from software architecture 2302 outside of the virtual machine, can execute within the virtual machine 2328 such as an OS 2350, libraries 2352, frameworks 2354, applications 2356, and/or a presentation layer 2358.

Figure 24:
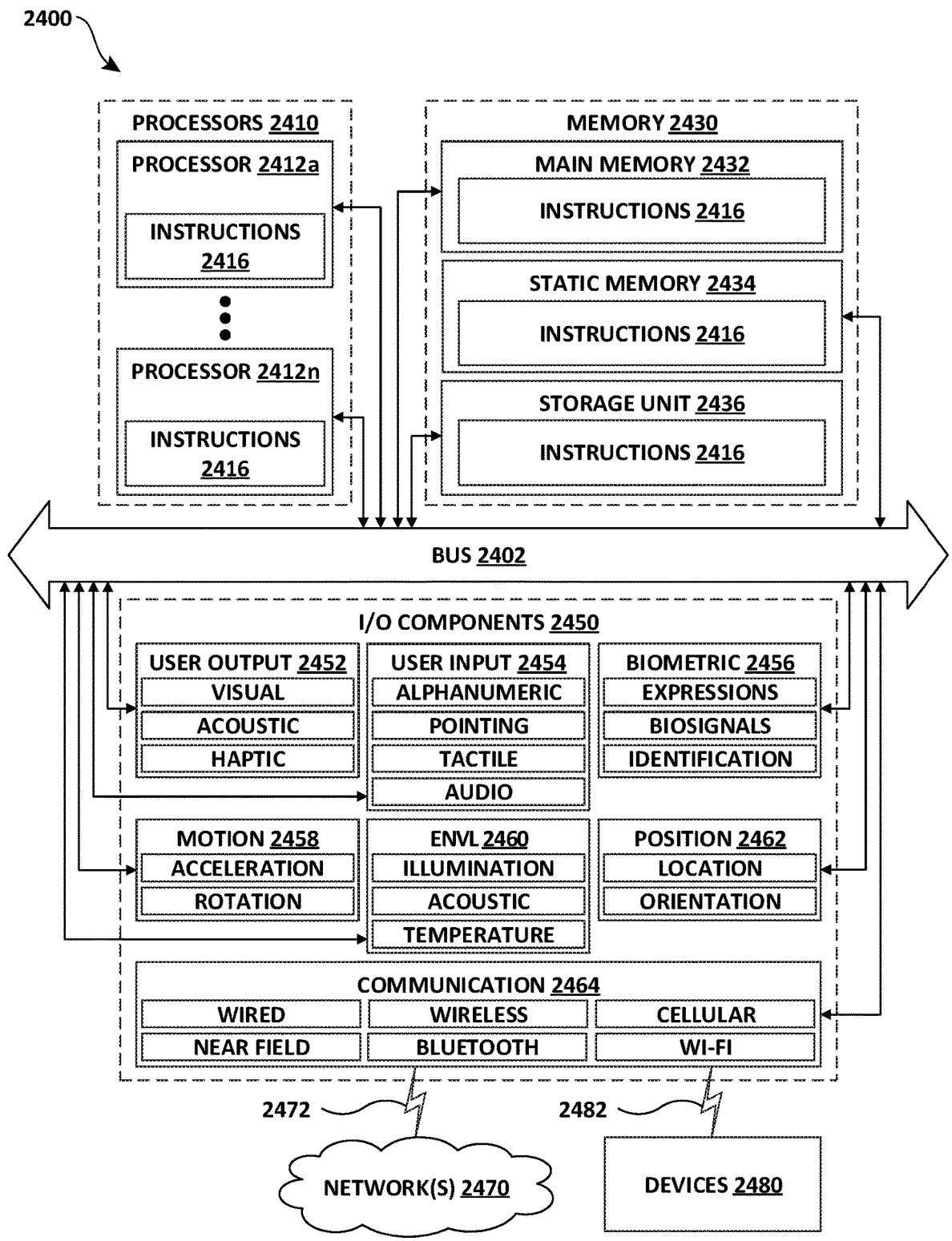
FIG. 24 shows a functional block diagram illustrating components of one example machine configured to read instructions from a machine-readable medium and perform any of the features described herein.

FIG. 24 is a block diagram illustrating components of an example machine 2400 configured to read instructions from a machine-readable medium (for example, a machine-readable storage medium) and perform any of the features described herein. The example machine 2400 is in a form of a computer system, within which instructions 2416 (for example, in the form of software components) for causing the machine 2400 to perform any of the features described herein may be executed. The instructions 2416 may therefore be used to implement methods or components described herein. The instructions 2416 cause unprogrammed and/or unconfigured machine 2400 to operate as a particular machine configured to carry out the described features. The machine 2400 may be configured to operate as a standalone device or may be coupled (for example, networked) to other machines. In a networked deployment, the machine 2400 may operate in the capacity of a server machine or a client machine in a server-client network environment, or as a node in a peer-to-peer or distributed network environment. Machine 2400 may be implemented as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 2400 is illustrated, the term "machine" includes a collection of machines that individually or jointly execute the instructions 2416.

The machine 2400 may include processors 2410, memory 2430, and I/O components 2450, which may be communicatively coupled via, for example, a bus 2402. The bus 2402 may include multiple buses coupling various elements of machine 2400 via various bus technologies and protocols. In an example, the processors 2410 (including, for example, a central processing unit (CPU), a graphics processing unit (GPU), a digital signal processor (DSP), an ASIC, or a suitable combination thereof) may include one or more processors 2412a to 2412n that may execute the instructions 2416 and process data. In some examples, one or more processors 2410 may execute instructions provided or identified by one or more other processors 2410. The term "processor" includes a multi-core processor including cores that may execute instructions contemporaneously. Although FIG. 24 shows multiple processors, the machine 2400 may include a single processor with a single core, a single processor with multiple cores (for example, a multi-core processor), multiple processors each with a single core, multiple processors each with multiple cores, or any combination thereof. In some examples, the machine 2400 may include multiple processors distributed among multiple machines.

The memory/storage 2430 may include a main memory 2432, a static memory 2434, or other memory, and a storage unit 2436, both accessible to the processors 2410 such as via the bus 2402. The storage unit 2436 and memory 2432, 2434 store instructions 2416 embodying any one or more of the functions described herein. The memory/storage 2430 may also store temporary, intermediate, and/or long-term data for processors 2410. The instructions 2416 may also reside, completely or partially, within the memory 2432, 2434, within the storage unit 2436, within at least one of the processors 2410 (for example, within a command buffer or cache memory), within memory at least one of I/O components 2450, or any suitable combination thereof, during execution thereof. Accordingly, the memory 2432, 2434, the storage unit 2436, memory in processors 2410, and memory in I/O components 2450 are examples of machine-readable media.

As used herein, "machine-readable medium" refers to a device able to temporarily or permanently store instructions and data that cause machine 2400 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 2416) for execution by a machine 2400 such that the instructions, when executed by one or more processors 2410 of the machine 2400, cause the machine 2400 to perform and one or more of the features described herein. Accordingly, a "machine-readable medium" may refer to a single storage device, as well as "cloud-based" storage systems or storage networks that include multiple storage apparatus or devices.

The I/O components 2450 may include a wide variety of hardware components adapted to receive input, provide output, produce output, transmit information, exchange information, capture measurements, and so on. The specific I/O components 2450 included in a particular machine will depend on the type and/or function of the machine. For example, mobile devices such as mobile phones may include a touch input device, whereas a headless server or IoT device may not include such a touch input device. The particular examples of I/O components illustrated in FIG. 24 are in no way limiting, and other types of components may be included in machine 2400. The grouping of I/O components 2450 are merely for simplifying this discussion, and the grouping is in no way limiting. In various examples, the I/O components 2450 may include user output components 2452 and user input components 2454. User output components 2452 may include, for example, display components for displaying information (for example, a liquid crystal display (LCD) or a projector), acoustic components (for example, speakers), haptic components (for example, a vibratory motor or force-feedback device), and/or other signal generators. User input components 2454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 2450 may include biometric components 2456 and/or position components 2462, among a wide array of other environmental sensor components. The biometric components 2456 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 2462 may include, for example, location sensors (for example, a Global Position System (GPS) receiver), altitude sensors (for example, an air pressure sensor from which altitude may be derived), and/or orientation sensors (for example, magnetometers).

The I/O components 2450 may include communication components 2464, implementing a wide variety of technologies operable to couple the machine 2400 to network(s) 2470 and/or device(s) 2480 via respective communicative couplings 2472 and 2482. The communication components 2464 may include one or more network interface components or other suitable devices to interface with the network (s) 2470. The communication components 2464 may include, for example, components adapted to provide wired communication, wireless communication, cellular communication, Near Field Communication (NFC), Bluetooth communication, Wi-Fi, and/or communication via other modalities. The device(s) 2480 may include other machines or various peripheral devices (for example, coupled via USB).

In some examples, the communication components 2464 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 2462, such as, but not limited to, geo-location via Internet Protocol (IP) address, location via Wi-Fi, cellular, NFC, Bluetooth, or other wireless station identification and/or signal triangulation.

Referring to FIGS. 1, 2, 3A-3I, and 24, example operations in one client-side process will be described. Description assumes a processor machine such as machine 2400, associated with (e.g., a component of) a client device such as one of the clients 106 or 108, storing particular instructions 2416 in its instruction memory 2432, 2434. The instructions 2416 can include ones that, when executed by the machine 2400, cause the machine to receive from a network, e.g., system 100 network 110, via a network interface (e.g., network interface server 112), data indicative of a current presence status of an object person and data indicative of a current responsiveness status of the person. Such data can be provided by the backend server 102, through its access to the current presence/responsiveness database 104. The data can be provided, for example, as a push operation of the backend server 102, or in response to a pull request from the client (106 or 108). The data from the backend server 102 can include information associating the object person with the received data indicating current presence status and current responsiveness status.

The object person's presence status can be relative to a reference, such as a particular cubicle or office within the office building (visible in FIG. 1 but not separately numbered) housing the clients 106. Responsiveness status can be relative to a given plurality or group of communication resources, for example, email, IM, and voice telephone.

The instructions 2416 can, when executed by the machine 2400, cause the machine to display on the UI screen 202 an indicator image, with an appearance based at least in part on the status data received from the backend server 102. As one example, the object person's name and image may already appear, respectively, in the name field 212 and image field 214 of the second PR status block 208-2. In one example implementation, the backend server 102 can be configured to provide to the client, as data indicative of the object person's current presence status and current responsiveness status, direct display data. In other words, assuming region 216 implements the first region of the indicator image, and region 218 implements the second region, the status data received from the backend server 102 can be the appearance information for the regions. In such implementation, server-side operations can perform determination of the object person's current presence status and current responsiveness status and send the status information to the client as display-ready data. For example, the received status data can include a first state appearance for the first region 216 and a second state appearance for the second region 218, first and second state appearance indicating, respectively, the server-side determined current presence status and current responsiveness status.

In another example client-side implementation, server-side functions can include certain collection, pre-processing, and formatting of status-related data, and the client machine (e.g., an instance of the machine 2400), in accordance with its instructions 2416, can select the first state appearance from a first group of appearances, based at least in part on the received (from the backend server 102) data indicative of the current presence status, and can select the second state appearance from a second group of appearances, based at least in part on the received data indicative of the current responsiveness status. Regarding content of the first group and second group, an example representation of such content can be, for the first group, the FIG. 2 visible legend appearances A1, A2, and A3, and an example representation of such content for the second group can be the same legend's appearances B1, B2, and B3.

As described above, one or more client-side implementations in the client can include or provide a "pull" functionality in the client device, for updating the appearance of the indicator image. For example, instructions 2416 can include instructions that, when executed by the machine 2400, can cause the machine to send to a server (e.g., backend server 102), via the network interface to the network, a request for status update. Instructions 2416 can also include ones that, upon receiving (e.g., from the backend server 102) a presence update data responsive to the earlier sent request for status update, can cause the machine 2400 to determine, based at least in part on that received presence update data, whether to update the current presence status. The instructions 2416 can include instructions that, upon the client machine determining 2400 to update the current presence status, can cause the machine 2400 to select an updated first state appearance from among the first group of appearances and update the display of the first region in accordance with the selected update. Referring to the example assumption above, of the object-person's name and image being in the second PR status block 208-2, an example operation can be updating of the block 208-2 first state appearance of region 216.

Implementations in the client device can include, for example, in association with the above-described "pull" functions, instructions 2416 that when executed by the machine 2400 can cause the machine, upon receiving (e.g., from the backend server 102) a responsiveness update data responsive to the client's request for status update, to determine, based at least in part on that received responsiveness update data, whether to update the current responsiveness status. and upon determining to update the current responsiveness status, to select an updated second state appearance from among the second group of appearances (e.g., from B1, B2, and B3), and update the display to display the second region (e.g., second region 218 of the second PR status block 208-2) in accordance with the updated second state appearance.

Various implementations and respective features and operations thereof are described above to include determinations, server-side, or client side, or both, of object persons' presence status and responsiveness status. Additional features can include manual setting, re-setting, and override of presence status, responsiveness status, or both. For example, one or more of the client devices 106 and 108 can include, e.g., by a touchscreen field, for manual entry. One example of such features can include an "I'm Present, but Not accessible for Face Time Meeting" button (not separately visible in the figures). One optional variation can include, for example, an administrator privileged override that can set presence status or responsiveness status, or both, for one or more persons. Such features can include communication of the manual override from the client device, for example, to the backend server 102.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, the claimed subject matter is not limited to implementations that solve any or all disadvantages noted in any part of this disclosure. Further, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for providing a visual indication of presence and responsiveness status of a person, comprising:
   a network interface configured to connect the system to a communication network;
   a processor; and
   a memory coupled to the processor, the memory storing executable instructions that when executed by the processor cause the processor to control the system to perform functions of:
      receiving, from the communication network, presence and responsiveness data of a person, the presence and responsiveness data including:
         a current presence status indicative of a physical location of the person;
         a current responsiveness status indicative of a responsiveness status of the person with respect to a group of communication resources; and
         an identifier of the person associated with the current presence status and current responsiveness status;
      based on the received presence and responsiveness data, displaying, via a graphical user interface (GUI) of the system, a single indicator image indicating the current presence status and current responsiveness status of the person in a non-textual manner, the single indicator having a geometric shape that includes:
         a first region having a first visual appearance comprising a first color, first visible pattern or first color-visual pattern combination representing the current presence status of the person; and
         a second region having a second visual appearance comprising a second color, second visible pattern or second color-visual pattern combination representing the current responsiveness status of the person;
      receiving, from the communication network, updated presence and responsiveness data indicating an update to the current presence status or current responsiveness status of the person; and
      in response to receiving the updated presence and responsiveness data, changing the first or second visual appearance to reflect the update to the current presence status or current responsiveness status of the person.

2. The system of claim 1, wherein the first and second regions are displayed according to at least one of a plurality of spatial arrangements comprising:
   a first spatial arrangement such that a geometric center of one of the first region and second region is within an encompassing perimeter of the other of the first region and second region;
   a second spatial arrangement such that a geometric centroid of one of the first region and second region is within a minimum encompassing perimeter of the other of the first region and second region;
   a third spatial arrangement such that a minimum encompassing perimeter of one of the first region and second region is within a minimum encompassing perimeter of the other of the first region and second region; and a fourth spatial arrangement such that the geometric centroid of one of the first region and second region is with a minimum encompassing perimeter of the other of the first region and second region.

3. The system of claim 1, wherein the first region directly borders the second region.

4. The system of claim 1, wherein the instructions, when executed by the processor, further cause the system to perform:

selecting, based on the received presence data, the first visual appearance from a first group of appearances comprising a first group of colors, a first group of visible patterns and a first group of color-visible pattern combinations; and selecting, based on the received responsiveness data, the second visual appearance from a second group of appearances comprising a second group of colors, a second group of visible patterns and a second group of color-visible pattern combinations.

5. The system of claim 4, wherein, for changing the first or second visual appearance, the instructions, when executed by the processor, further cause the system to perform:

selecting, from the first group of appearances, an updated first visual appearance representing the update to the current presence status of the person; and displaying, via the GUI, the updated first visual appearance for the first region of the single indicator image.

6. The system of claim 4, wherein, for changing the first or second visual appearance, the instructions, when executed by the processor, further cause the system to perform:

selecting, from the second group of appearances, an updated second visual appearance representing the update to the current responsiveness status of the person; and displaying, via the GUI, the updated second visual appearance for the second region of the single indicator image.

7. The system of claim 4, wherein:

the second region includes a first ring and a second ring at least partially surrounding the first ring, the second visual appearance includes a third visual appearance of the first ring in combination with a fourth visual appearance of the second ring, and the instructions, when executed by the processor, further cause the processor to control the system to perform selecting, from the second group of appearances, a pair of mutually different appearances comprising (i) a first color, first visible pattern or first color-visible pattern combination for the first ring and (ii) a second color, second visible pattern or second color-visible pattern combination for the second ring.

8. The system of claim 4, wherein:

the first region includes a first sub-region and a second sub-region, and the executable instructions, when executed by the processor, further cause the system to perform:

receiving, from a server via the communication network, next presence status data indicative of a next presence status of the person;

selecting, based on the received next presence status data, a third visual appearance from the first group of appearances;

displaying, via the GUI, the first visual appearance for the first sub-region of the first region of the single indicator image; and displaying, via the GUI, the third visual appearance for the second sub-region of the first region of the single indicator image.

9. The system of claim 4, wherein:

the second region includes a first ring and a second ring at least partially surrounding the first ring, and the instructions, when executed by the processor, further cause the system to perform:

receiving, from a server via the communication network, next responsiveness status data indicative of a next responsiveness status of the person;

selecting, based on the received next responsiveness status data, a third visual appearance from the second group of appearances;

displaying, via the GUI, the first visual appearance for the first ring of the second region of the single indicator image; and displaying, via the GUI, the third visual appearance for the second ring of the second region of the single indicator image.

10. A method of operating a data processing system for providing a visual indication of presence and responsiveness statutes of a person, comprising:

receiving, from a communication network, presence and responsiveness data of a person, the presence and responsiveness data including:

a current presence status indicative of a physical location of the person;

a current responsiveness status indicative of a responsiveness status of the person with respect to a group of communication resources; and an identifier of the person associated with the current presence status and current responsiveness status;

based on the received presence and responsiveness data, displaying, via a graphical user interface (GUI) of the data processing system, a single indicator image indicating the current presence status and current responsiveness status of the person in a non-textual manner, the single indicator having a geometric shape that includes:

a first region having a first visual appearance comprising a first color, first visible pattern or first color-visual pattern combination representing the current presence status of the person; and a second region having a second visual appearance comprising a second color, second visible pattern or second color-visual pattern combination representing the current responsiveness status of the person;

receiving, from the communication network, updated presence and responsiveness data indicating an update to the current presence status or current responsiveness status of the person; and in response to receiving the updated presence and responsiveness data, changing the first or second visual appearance to reflect the update to the current presence status or current responsiveness status of the person.

11. The method of claim 10, wherein the first and second regions are displayed according to at least one of a plurality of spatial arrangements comprising:

a first spatial arrangement such that a geometric center of one of the first region and second region is within an encompassing perimeter of the other of the first region and second region;

a second spatial arrangement such that a geometric centroid of one of the first region and second region is within a minimum encompassing perimeter of the other of the first region and second region;

a third spatial arrangement such that a minimum encompassing perimeter of one of the first region and second region is within a minimum encompassing perimeter of the other of the first region and second region; and a fourth spatial arrangement such that the geometric centroid of one of the first region and second region is with a minimum encompassing perimeter of the other of the first region and second region.

12. The method of claim 10, wherein the first region directly borders the second region.

13. The method of claim 10, further comprising:
selecting, based on the received presence data, the first visual appearance from a first group of appearances comprising a first group of colors, a first group of visible patterns and a first group of color-visible pattern combinations; and
selecting, based on the received responsiveness data, the second visual appearance from a second group of appearances comprising a second group of colors, a second group of visible patterns and a second group of color-visible pattern combinations.

14. The method of claim 13, wherein changing the first or second visual appearance comprises:
selecting, from the first group of appearances, an updated first visual appearance representing the update to the current presence status of the person; and
displaying, via the GUI, the updated first visual appearance for the first region of the single indicator image.

15. The method of claim 13, wherein changing the first or second visual appearance comprises:
selecting, from the second group of appearances, an updated second visual appearance representing the update to the current responsiveness status of the person; and
displaying, via the GUI, the updated second visual appearance for the second region of the single indicator image.

16. The method of claim 13, wherein
the second region includes a first ring and a second ring at least partially surrounding the first ring,
the second visual appearance includes a third visual appearance of the first ring in combination with a fourth visual appearance of the second ring, and
the method further comprises selecting, from the second group of appearances, a pair of mutually different appearances comprising (i) a first color, first visible pattern or first color-visible pattern combination for the first ring and (ii) a second color, second visible pattern or second color-visible pattern combination for the second ring.

17. The method of claim 13, wherein:
the first region includes a first sub-region and a second sub-region, and
the method further comprises:
receiving, from a server via the communication network, next presence status data indicative of a next presence status of the person;
selecting, based on the received next presence status data, a third visual appearance from the first group of appearances;
displaying, via the GUI, the first visual appearance for the first sub-region of the first region of the single indicator image; and
displaying, via the GUI, the third visual appearance for the second sub-region of the first region of the single indicator image.

18. The method of claim 13, wherein:
the second region includes a first ring and a second ring at least partially surrounding the first ring, and
the method further comprises:
receiving, from a server via the communication network, next responsiveness status data indicative of a next responsiveness status of the person;
selecting, based on the received next responsiveness status data, a third visual appearance from the second group of appearances;
displaying, via the GUI, the first visual appearance for the first ring of the second region of the single indicator image; and
displaying, via the GUI, the third visual appearance for the second ring of the second region of the single indicator image.

19. A non-transitory computer readable medium containing instructions which, when executed by a processor, cause a data processing system to perform functions of:
receiving, from a communication network, presence and responsiveness data of a person, the presence and responsiveness data including:
a current presence status indicative of a physical location of the person;
a current responsiveness status indicative of a responsiveness status of the person with respect to a group of communication resources; and
an identifier of the person associated with the current presence status and current responsiveness status;
based on the received presence and responsiveness data, displaying, via a graphical user interface (GUI) of the data processing system, a single indicator image indicating the current presence status and current responsiveness status of the person in a non-textual manner, the single indicator having a geometric shape that includes:
a first region having a first visual appearance comprising a first color, first visible pattern or first color-visual pattern combination representing the current presence status of the person; and
a second region having a second visual appearance comprising a second color, second visible pattern or second color-visual pattern combination representing the current responsiveness status of the person;
receiving, from the communication network, updated presence and responsiveness data indicating an update to the current presence status or current responsiveness status of the person; and
in response to receiving the updated presence and responsiveness data, changing the first or second visual appearance to reflect the update to the current presence status or current responsiveness status of the person.

20. The non-transitory computer readable medium of claim 19, wherein the instructions, when executed by the processor, further cause the processor to control the data processing system to perform:
selecting, based on the received presence data, the first visual appearance from a first group of appearances comprising a first group of colors, a first group of visible patterns and a first group of color-visible pattern combinations; and
selecting, based on the received responsiveness data, the second visual appearance from a second group of appearances comprising a second group of colors, a second group of visible patterns and a second group of color-visible pattern combinations.

* * * * *